(12) United States Patent
Chen et al.

(10) Patent No.: US 11,657,454 B2
(45) Date of Patent: May 23, 2023

(54) SYSTEM AND METHOD FOR CONSTRUCTING OPTIMIZED ESG INVESTMENT PORTFOLIOS

(71) Applicant: PANAGORA ASSET MANAGEMENT, INC, Boston, MA (US)

(72) Inventors: Mike Chen, Boston, MA (US); George D. Mussalli, Boston, MA (US)

(73) Assignee: PANAGORA ASSET MANAGEMENT, INC, Boston, MA (US)

( * ) Notice: Subject to any disclaimer, the term of this patent is extended or adjusted under 35 U.S.C. 154(b) by 845 days.

(21) Appl. No.: 16/419,257

(22) Filed: May 22, 2019

(65) Prior Publication Data

US 2019/0362427 A1 Nov. 28, 2019

Related U.S. Application Data

(60) Provisional application No. 62/675,262, filed on May 23, 2018.

(51) Int. Cl.
*G06Q 40/06* (2012.01)
*G06Q 10/067* (2023.01)
*G06Q 30/0282* (2023.01)
*G06F 40/30* (2020.01)

(52) U.S. Cl.
CPC ............ *G06Q 40/06* (2013.01); *G06F 40/30* (2020.01); *G06Q 10/067* (2013.01); *G06Q 30/0282* (2013.01)

(58) Field of Classification Search
CPC ..................................................... G06Q 40/06
See application file for complete search history.

(56) References Cited

U.S. PATENT DOCUMENTS

| 7,277,864 | B2 | 10/2007 | Ohnemus et al. | |
| 7,424,451 | B1 * | 9/2008 | Moore | G06Q 40/04 705/37 |
| 8,200,527 | B1 | 6/2012 | Thompson et al. | |

(Continued)

*Primary Examiner* — Scott C Anderson
(74) *Attorney, Agent, or Firm* — AKC Patents, LLC; Aliki K. Collins

(57) ABSTRACT

A system for constructing an environmental, social and governance (ESG) optimized investment portfolio includes an ESG database, an alpha database, a user interface, and an ESG optimization engine. The ESG database includes ESG data for one or more investment products used to construct an investment portfolio. The alpha database includes alpha data for the one or more investment products used to construct the investment portfolio and the alpha data comprise rate of return data for the one or more investment products. The user interface is used for receiving a user's input for selecting an ESG optimization factor. The ESG optimization engine includes an ESG optimization application that receives alpha data for the one or more investment products of the investment portfolio, ESG data for the one or more investment products of the investment portfolio and the user's ESG optimization factor and calculates a combined alpha-ESG rate of return for the investment portfolio, a combined alpha-ESG factor for the investment portfolio and a covariance between the combined alpha-ESG factor and the combined alpha-ESG rate of return for the investment portfolio.

14 Claims, 26 Drawing Sheets

(56) References Cited

U.S. PATENT DOCUMENTS

| | | |
|---|---|---|
| 8,255,271 B2 | 8/2012 | Ohnemus et al. |
| 8,380,604 B2 | 2/2013 | Arnott et al. |
| RE44,098 E | 3/2013 | Arnott et al. |
| 8,612,270 B2 | 12/2013 | Hazy |
| 8,694,402 B2 | 4/2014 | Arnott et al. |
| 8,799,044 B2 | 8/2014 | Rao et al. |
| 9,070,134 B2 | 6/2015 | Gidwani et al. |
| 9,466,084 B2 | 10/2016 | Chanavat |
| 2007/0162365 A1* | 7/2007 | Weinreb ................ G06Q 40/00 705/35 |
| 2012/0296845 A1* | 11/2012 | Andrews ................ G06Q 40/06 705/36 R |
| 2013/0103624 A1* | 4/2013 | Thieberger ........... G06K 9/6256 706/12 |
| 2015/0057996 A1* | 2/2015 | Koinuma ............. G06F 40/129 704/9 |
| 2016/0117774 A1 | 4/2016 | Bateman |
| 2016/0210707 A1* | 7/2016 | Strnad, II .......... G06Q 30/0278 |
| 2017/0024822 A1 | 1/2017 | Chanavat |
| 2018/0013891 A1* | 1/2018 | Charlson ........... H04M 3/42059 |

\* cited by examiner

From FIG. 17A

Assign polarity to n-grams  416
- Positive: if there is at least one positive word and no negative word
- Negative: if there is at least one negative word and no positive word Calculate Sentiment Score:  418
- $Positive\ Sentiment = \dfrac{\#\ of\ Positive\ n\text{-}grams}{total\ \#\ of\ n\text{-}grams}$
- $Negative\ Sentiment = \dfrac{\#\ of\ Negative\ n\text{-}grams}{total\ \#\ of\ n\text{-}grams}$
- $Sentiment = \dfrac{\#\ of\ Positive\ n\text{-}grams - \#\ of\ Negative\ n\text{-}grams}{total\ \#\ of\ n\text{-}grams}$ Add cross-entropy H and the Sentiment score to obtain the Unusualness factor  420

FIG. 17B

SYSTEM AND METHOD FOR CONSTRUCTING OPTIMIZED ESG INVESTMENT PORTFOLIOS

CROSS REFERENCE TO RELATED CO-PENDING APPLICATIONS

This application claims the benefit of U.S. provisional application Ser. No. 62/675,262 filed on May 23, 2018 and entitled SYSTEM AND METHOD FOR CONSTRUCTING OPTIMIZED ESG INVESTMENT PORTFOLIOS, which is commonly assigned and the contents of which are expressly incorporated herein by reference.

FIELD OF THE INVENTION

The present invention relates to a system and a method for constructing optimized Environmental, Social and Governance (ESG) portfolios, and in particular to a system and a method for constructing investment portfolios that optimize traditional alpha objectives combined with ESG objectives.

BACKGROUND OF THE INVENTION

Financial investing decisions are usually made based on the financial rate of return of an investment product. This is the typical criterion for classical (or alpha)-type investing. However, there are other criteria that may be also used to decide where to make an investment. One of these other criteria is a company's adherence to environmental, social and governance (ESG) principles. Companies that incorporate these traits into their core philosophies are seemingly more aligned with stakeholder interests and often have better financial performance over the long run than those companies with the weakest ESG records.

Investors are increasingly adopting strategies that combine these new ESG principles with existing methods of identifying attractive investment opportunities. However, this is still an evolving field and there is no conclusive process to best construct ESG portfolios that optimally combine profit maximizing characteristics with ESG characteristics as well as client-specific requirements.

A wide spectrum of ESG investment solutions exists as a result of various approaches being taken to address a growing desire for ESG portfolios. The challenge for the investment community, however, is that asset owners who invest in ESG-centric strategies assign different relative importance between ESG criteria and alpha investing criteria. FIG. 1 shows the continuum of ESG products 50 offered by asset managers ranging from purely ESG-focused (impact investing) 60 to ESG agnostic (classic investing) 52. Another consideration is which ESG issues specifically should a portfolio incorporate and address? While there is universal agreement amongst asset owners that outperforming their stated benchmark is desirable, there is much less agreement when it comes to ESG incorporation. For example, one asset owner may primarily be concerned with environmental pollution, while another may care more about gender equality and workplace diversity.

The current ESG offerings can be grouped as follows:
Restriction-list-based: This approach, commonly called SRI (Socially Responsible Investing), is the earliest form of ESG investing. This method excludes companies involved in controversial topics such as tobacco, gambling, cluster munitions, among others, from the investable universe. Portfolios based on this approach typically result in lower achieved alpha versus their non-exclusion-list counterparts. The smaller opportunity set reduces the maximum obtainable return by the manager. Furthermore, for those stocks in the investment universe, no distinctions are made between relatively good or bad ESG companies. Therefore, this is a rudimentary approach to ESG investing that likely will deliver less than optimal ESG and Alpha results.

Integration Investing: In this approach, ESG factors are incorporated into stock selection and portfolio construction considerations. A growing body of research suggests that ESG factors can contribute to long-term financial performance either through increasing upside opportunities or minimizing downside risks. As a result, ESG becomes another criterion upon which stocks are evaluated, much like value, quality, among others. This approach is attractive from the perspective that ESG issues are evaluated only along the alpha dimension.

Impact Investing: In this approach, investors direct capital towards companies which provide solutions to social and environmental issues and to affect real world outcomes. One key challenge of this approach is the measurability of outcomes. Increasingly, the United Nations Sustainable Development Goals (SDGs) is emerging as the dominant framework around which impact investment results are measured. Popular ESG vendor metrics are also used to measure a portfolio's impact or ESG rating. In this approach, a given portfolio is evaluated along both ESG and alpha dimensions. Given the increased availability of data and computing power, the investment community is increasingly adopting quantitative approaches. However, when it comes to ESG portfolios, even quantitative managers do not optimally integrate their traditional and ESG factors in such a way as to maximize joint ESG and alpha performance according to reasonable metrics. The reason for this is because in the traditional sense, the manager's job is to maximize alpha per unit of risk.

Accordingly, there is a need for systems and methods for constructing ESG portfolios that optimally combine profit maximizing characteristics with ESG characteristics as well as client-specific requirements.

SUMMARY OF THE INVENTION

The present invention relates to a system and a method for constructing investment portfolios that optimize traditional alpha objectives combined with ESG objectives.

In general, in one aspect, the invention features a system for constructing an environmental, social and governance (ESG) optimized investment portfolio including an ESG database, an alpha database, a user interface, and an ESG optimization engine. The ESG database includes ESG data for one or more investment products used to construct an investment portfolio. The alpha database includes alpha data for the one or more investment products used to construct the investment portfolio and the alpha data comprise rate of return data for the one or more investment products. The user interface is used for receiving a user's input for selecting an ESG optimization factor. The ESG optimization engine includes an ESG optimization application that receives alpha data for the one or more investment products of the investment portfolio, ESG data for the one or more investment products of the investment portfolio and the user's ESG optimization factor and calculates a combined alpha-ESG rate of return for the investment portfolio, a combined alpha-ESG factor for the investment portfolio and a covariance between the combined alpha-ESG factor and the combined alpha-ESG rate of return for the investment portfolio. The system also includes a computing system that has at least a processor configured to execute computer-implemented instructions of the ESG optimization application.

Implementations of this aspect of the invention may include one or more of the following features. The combined alpha-ESG rate of return for the investment portfolio is calculated via $$R_t^c = (1-\gamma)R_t + \gamma R_t^{ESG}$$

wherein $R_t$ comprises an alpha rate of return for the investment portfolio for time period t, wherein $R_t^{ESG}$ comprises any third party, unbiased measure of the user's selected ESG optimization factor for time period t, wherein $\gamma$ is a tunable scalar and wherein product $\gamma R_t^{ESG}$ maps a measure of the selected ESG optimization factor for time period t to a real number and adjusts it by the tunable scalar and wherein $R_t^c$ is the combined rate of return at the end of time period t. The combined alpha-ESG factor for the investment portfolio is calculated via $$F_t^c = \sum_{i=1}^{M} v_i F_{i,t} + \sum_{j=M+1}^{N} v_j^{ESG} F_{j,t}^{ESG}.$$

wherein $F_{i,t}$ is an alpha factor, $F^{ESG}_{j,t}$ is an ESG optimization factor, $v_i$, $v^{ESG}_j$ are weights, and $F^c_t$ is the combined alpha-ESG factor for the investment portfolio at the beginning of time period t. The covariance between the combined alpha-ESG factor and the combined alpha-ESG rate of return for the investment portfolio is used to calculate an excess rate of return during time period t via $$\alpha_t = \frac{(N-1)}{\lambda_t} \text{cov}(F_t^c, R_t^c)$$
$$= \frac{(N-1)}{\lambda_t} \rho(F_t^c, R_t^c) \sigma(F_t^c) \sigma(R_t^c)$$

wherein cov($F^c_t$, $R_t^c$) is the covariance between the combined alpha-ESG factor $F^c_t$ and combined alpha-ESG rate of return $R_t^c$, wherein $\rho(F^c_t, R_t^c)$ is a correlation of the combined alpha-ESG factor $F^c_t$ and the combined alpha-ESG rate of return $R_t^c$ and wherein $\sigma(F^c_t)$ is a standard deviation of the combined alpha-ESG factor $F^c_t$ and $\sigma(R_t^c)$ is the standard deviation of the alpha-ESG rate of return $R_t^c$. The ESG data comprise publicly available ESG vendor data and PanAgora ESG data. The PanAgora ESG data comprise one of employee sentiment, ESG dictionary, management sentiment, women on board, ESG spin, ESG momentum, and unusual ESG news. The PanAgora ESG data comprise employee sentiment data and the employee sentiment data are collected using web-scraping techniques. The PanAgora ESG data comprise an ESG dictionary that comprises words extracted from sustainability reports. The PanAgora ESG data comprise management sentiment data that are extracted from company internal documents and communications using the ESG dictionary and calculating aggregate textual tone. The PanAgora ESG data comprise ESG spin data and the ESG spin data comprise a difference between publicly available ESG data and ESG management sentiment. The PanAgora ESG data comprise unusual ESG news collected using web-scraping techniques and analyzing the collected data. The publicly available ESG vendor data comprise data from one of OwlShare, TR Asset 4, MSCI ESG, RepRisk, and Sustainalytics, among others.

In general, in another aspect, the invention features a method for constructing an environmental, social and governance (ESG) optimized investment portfolio including the following. Providing an ESG database comprising ESG data for one or more investment products used to construct an investment portfolio. Providing an alpha database comprising alpha data for the one or more investment products used to construct the investment portfolio and wherein the alpha data comprise rate of return data for the one or more investment products. Next, receiving a user's input for selecting an ESG optimization factor via a user interface. Providing an ESG optimization engine comprising an ESG optimization application that receives alpha data for the one or more investment products of the investment portfolio, ESG data for the one or more investment products of the investment portfolio and the user's ESG optimization factor and calculates a combined alpha-ESG rate of return for the investment portfolio, a combined alpha-ESG factor for the investment portfolio and a covariance between the combined alpha-ESG factor and the combined alpha-ESG rate of return for the investment portfolio. Providing a computing system comprising at least a processor configured to execute computer-implemented instructions of the ESG optimization application.

In general, in another aspect, the invention features a method for constructing an ESG dictionary including the following. Reading all words from a plurality of sustainability reports. Next, removing all stop words and replacing uppercase letters with lowercase letters. Next, ranking the words by frequency and constructing a word frequency list. Next, extracting a group of nouns from the word frequency list. Next, assigning polarity to each noun manually. Next, extracting a group of verbs and a group of adjectives from the word frequency list. Next, adding antonyms of each verb and each adjective to the group of verbs and group of adjectives, respectively. Finally, assigning polarity to each verb and each adjective automatically using a Python built-in dictionary. Polarity is assigned to each word manually by first entering a word into the ESG dictionary, then checking to see if the word is ESG related, then removing the word if it is not ESG related, then assigning polarity to the word if it is ESG related, wherein the polarity comprises one of positive, negative or neutral values.

In general, in another aspect, the invention features a method for constructing an ESG management sentiment including the following. First, providing an ESG dictionary and using the ESG dictionary to develop combinations of verbs and/or adjectives with ESG nouns using rules in FIG. 12A and FIG. 12B. Next, searching for the combinations of verbs and/or adjectives with ESG nouns in company internal documents and communications. Next, calculating an ESG management sentiment via:

ESG Manager Sentiment=(Number of positive hits−Number of negative hits)/number of total hits The method further includes calculating an ESG Spin by taking the difference between an externally provided ESG rating and the ESG management sentiment.

In general, in another aspect, the invention features a method of constructing an unusual ESG news factor including the following. First, web-scraping to extract news titles for a specific company and links on a search engine for a specific time-period. Next, downloading relevant full articles using a Python newspaper package. Next, generating evaluation datasets and training datasets, wherein the evaluation datasets comprise all news texts for a current month period and the training datasets comprise all news texts for two years previous to the current month period. For each evaluation dataset extracting n-grams and counting frequencies, wherein an n-gram comprises a specified sequence of n-words. Next, calculating probability $p_i$ of occurrence of an $i^{th}$ n-gram in an evaluation dataset via:

$$p_i = c_i / \Sigma c_i.$$

For each extracted $i^{th}$ n-gram calculating model probability $m_i$ of occurrence of the $i^{th}$ n-gram in a training dataset via:

$$m_i = c\{w_1, w_2, w_3, w_4\}_i / c\{w_1, w_2, w_3\}_i.$$

Next, calculating a cross-entropy H of the model probability $m_i$ with respect to the probability $p_i$ via:

$$H = -\Sigma p_i \log(m_i) \text{ for } (i=1 \text{ to } I).$$

Next, assigning polarity to each $i^{th}$ n-gram extracted from the evaluation text. Next, calculating positive sentiment, negative sentiment and overall sentiment via:

Positive Sentiment=Number of positive n-grams/total number of n-grams

Negative Sentiment=Number of negative n-grams/total number of n-grams

Overall Sentiment=(Number of positive n-grams−Number of negative n-grams)/total number of n-grams.

Finally, calculating the unusual ESG news factor by taking the sum of the cross-entropy H and the Overall Sentiment.

BRIEF DESCRIPTION OF THE DRAWINGS

Referring to the figures, wherein like numerals represent like parts throughout the several views:

FIG. 9A depicts a WordCloud of All Words from 500 sustainability reports used to construct an ESG Dictionary;

FIG. 9B depicts a WordCloud of verbs from the 500 sustainability reports used to construct an ESG Dictionary;

FIG. 9C depicts a WordCloud of adjectives from the 500 sustainability reports used to construct an ESG Dictionary;

FIG. 17A and FIG. 17B depict a flow diagram for the process of constructing a measure of the "unusual ESG news factor";

DETAILED DESCRIPTION OF THE INVENTION

The present invention provides a system and a method for constructing ESG portfolios that optimally combine profit maximizing characteristics with ESG characteristics as well as client-specific requirements.

Figure 1:
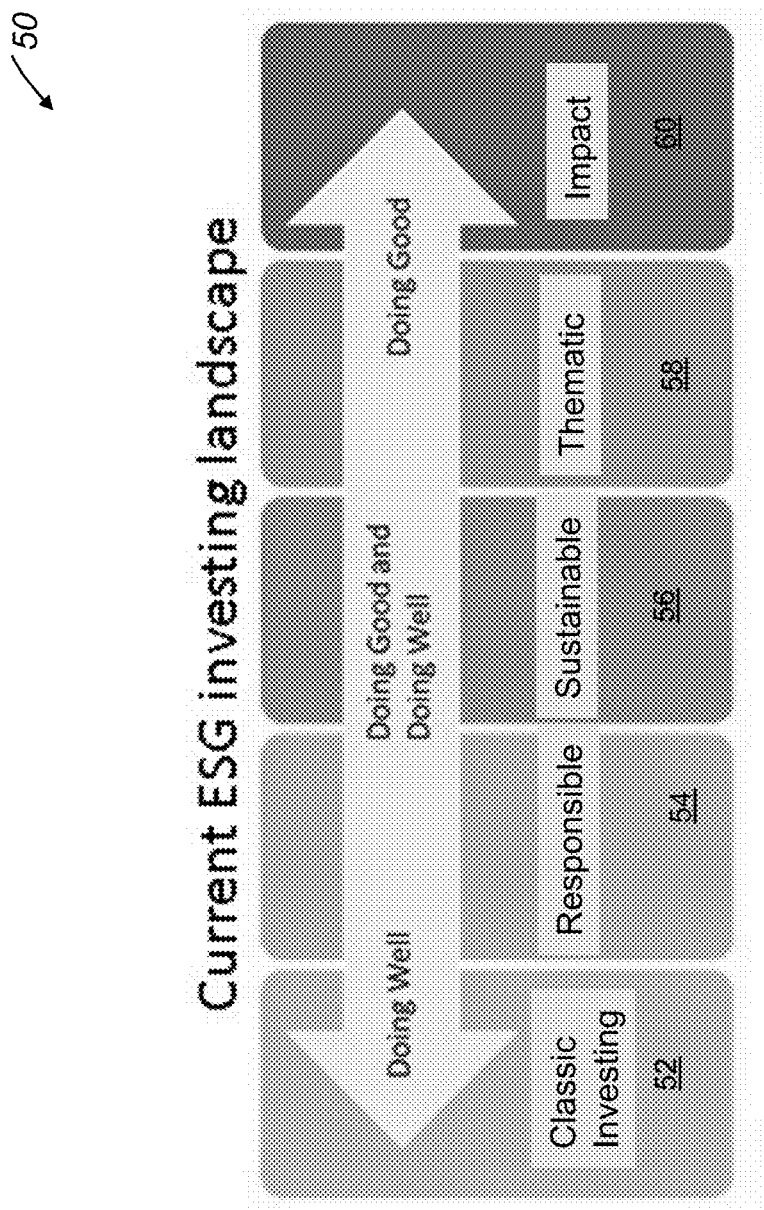
FIG. 1 depicts the current ESG investing landscape.
Figure 2A:
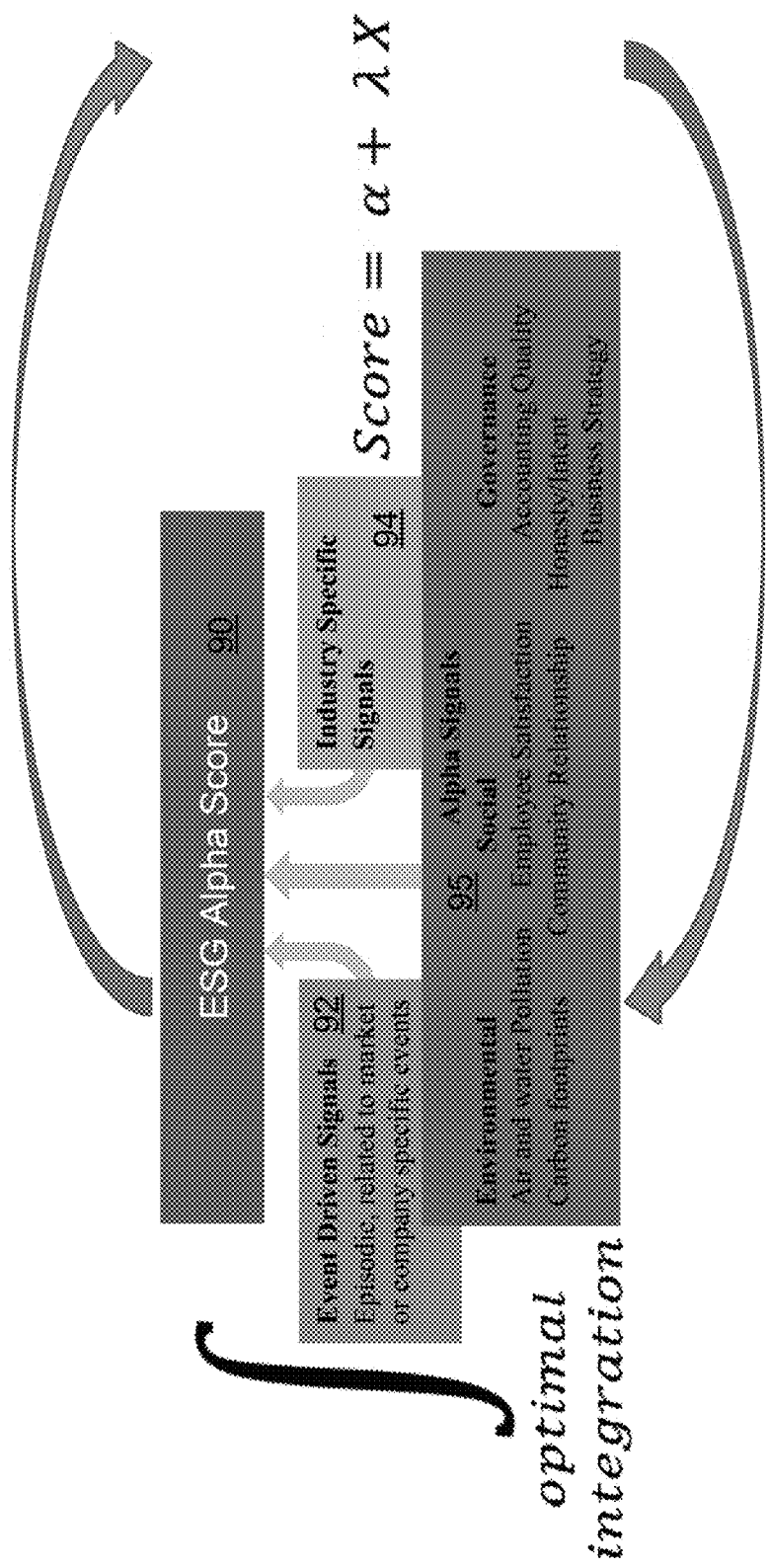
FIG. 2A depict schematic diagrams of a process for constructing ESG investment portfolios according to this invention.

Referring to FIG. 2A, the stock selection ESG-based process takes into consideration alpha signals (α) with long term investment horizons 95, industry specific signals 94, and event-driven signals 92. The stock selection process also takes into consideration the client's input regarding relative importance of ESG performance versus alpha performance (λ), and the client's input regarding the ESG metrics that matter the most to them (X). The composite score is expressed as follows:

$$\text{Score} = \alpha + \lambda X$$

Figure 2B:
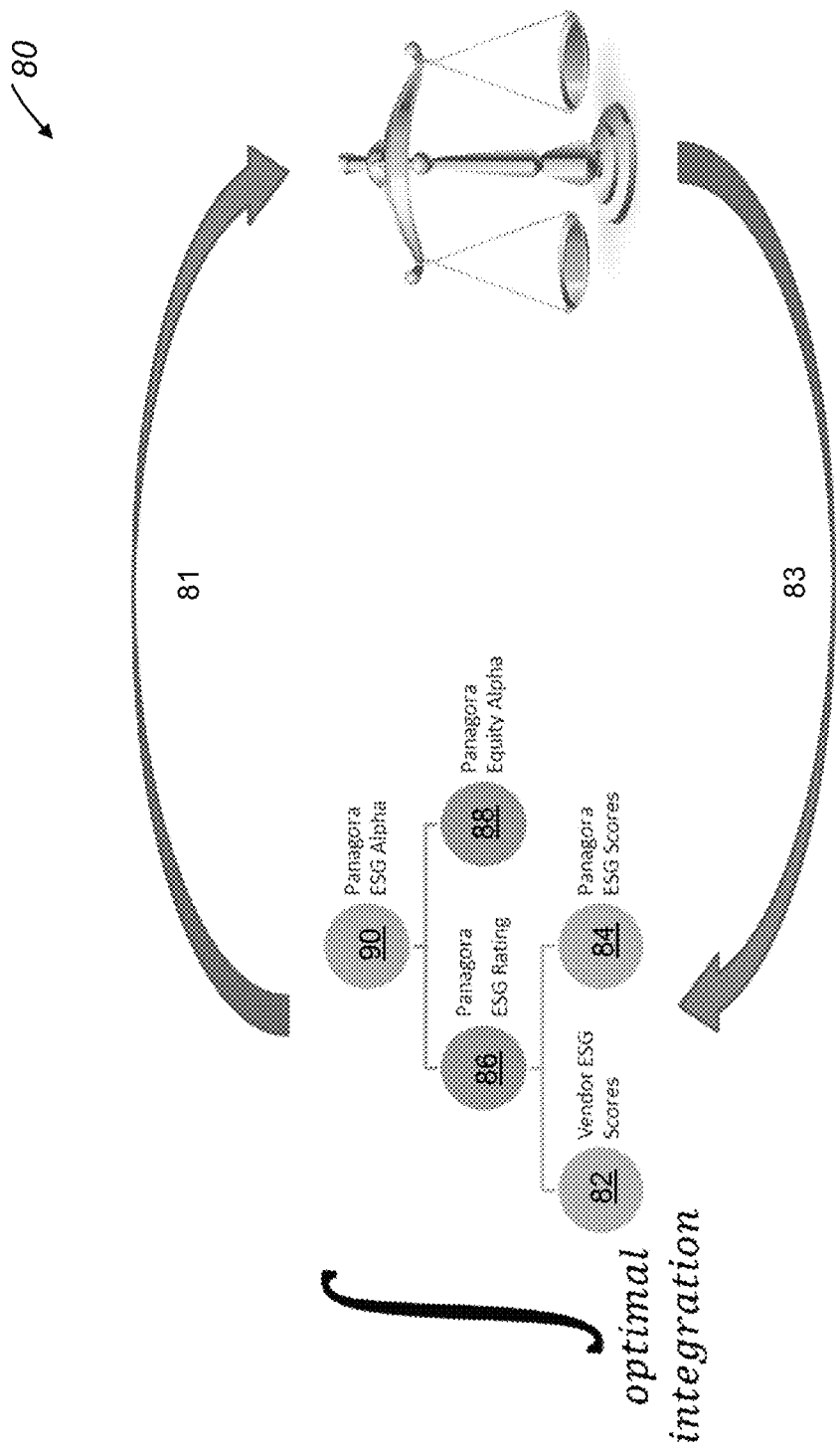
FIG. 2B depicts a schematic diagram of a framework for constructing ESG investment portfolios according to this invention

Referring to FIG. 2B, an integrated ESG, alpha and impact tracking framework 80 for constructing ESG-Alpha portfolios includes ESG vendor data 82, PanAgora specific ESG data 84, and PanAgora equity alpha data 88. The ESG vendor data 82 and the PanAgora specific ESG data 84 are combined to generate a combined ESG rating 86 and the combined ESG rating 86 and the equity alpha data 88 are used as inputs for the process of constructing an integrated ESG-Alpha portfolio 90.

Figure 3:
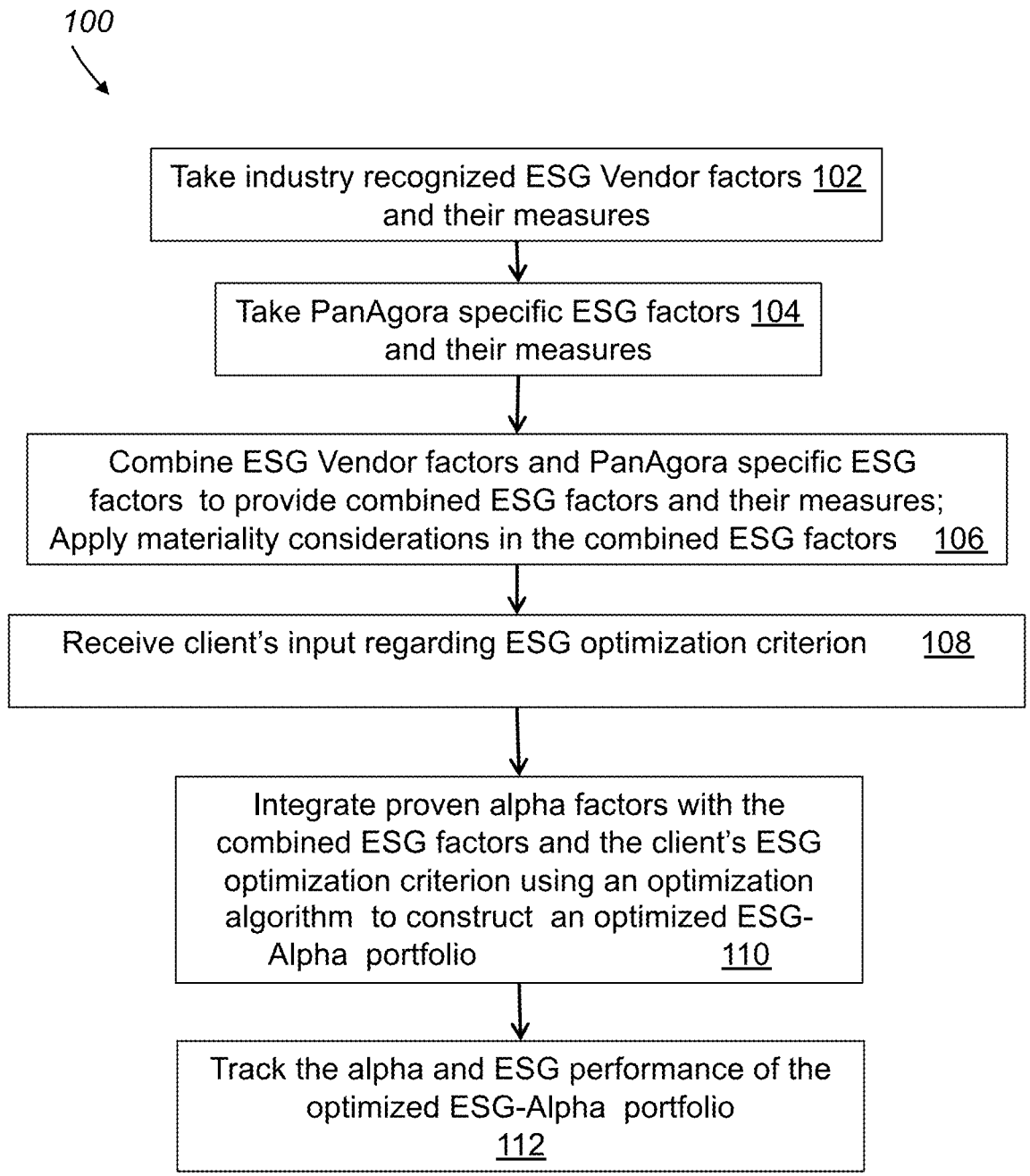
FIG. 3 depicts a flow diagram for the method of constructing ESG investment portfolios, according to this invention.

Referring to FIG. 3, a method 100 of constructing ESG investment portfolios that optimize traditional alpha objectives combined with ESG objectives, based on the framework 80, includes the following step. First, we take industry recognized third party ESG Vendor factors 82 and their measures (102). Next, we take internally developed PanAgora specific ESG factors 84 and their measures (104). We combine the third party ESG Vendor factors 82 and the internally developed PanAgora specific ESG factors 84 applying PanAgora developed materiality considerations to provide combined ESG factors 86 and their measures (106). Next, we receive the client's (or investor's) input and selection regarding the ESG optimization criterion (108). Next, we receive proven alpha factors and together with the combined ESG factors 86 and with the client's selected optimization criterion and we use them to construct an optimized ESG-Alpha portfolio via and an optimization algorithm (110). The optimization algorithm optimizes the investment portfolio both in the alpha direction and in the selected ESG factor direction, as will be described below. Finally, we track the alpha and ESG performance of the optimized ESG-Alpha portfolio (112).

Figure 4:
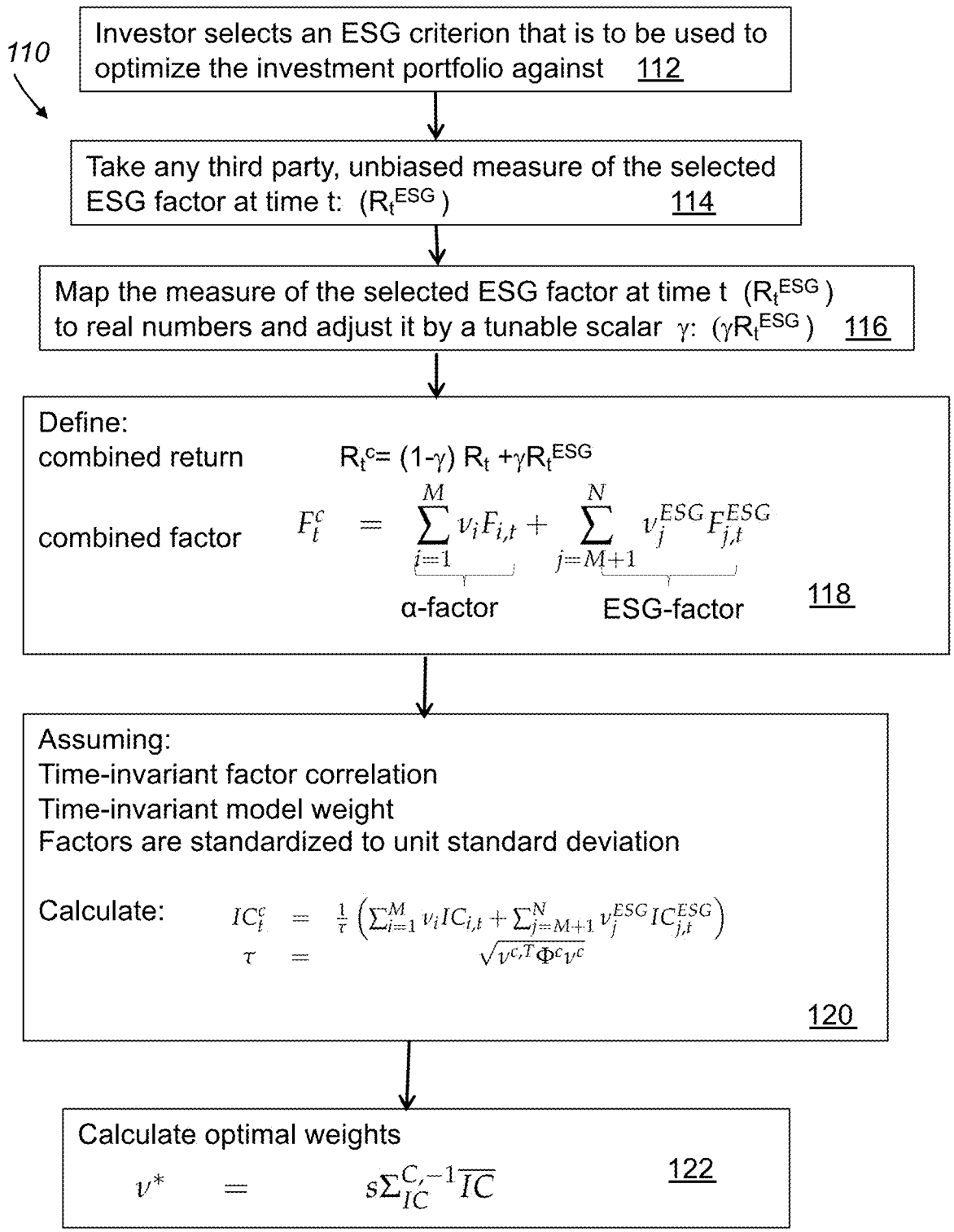
FIG. 4 depicts a flow diagram for the integration process of alpha factors with ESG factors and with the client's input, according to this invention.

Referring to FIG. 4, a flow diagram of the ESG-Alpha integration process 110 includes the following. First, we receive the client's selection of the ESG factor that is to be used to optimize the investment portfolio against (112). Next, we take any third party, unbiased measure of the client selected ESG factor at time t: $R_t^{ESG}$ (114). Next, we map the measure of the selected ESG factor at time t to real number and adjust it by a tunable scalar $\gamma$. $\gamma R_t^{ESG}$ to put it in the same range as stock returns for a given optimization time horizon (116). The score $\gamma R_t^{ESG}$ is the investor's utility along the ESG dimension. Next, we define the combined return:

$$R_t^c = (1-\gamma)R_t + \gamma R_t^{ESG}$$

and the combined alpha and ESG factor:

$$F_t^c = \sum_{i=1}^{M} v_i F_{i,t} + \sum_{j=M+1}^{N} v_j^{ESG} F_{j,t}^{ESG}$$

where $F_{i,t}$ is an $\alpha$ factor, $F^{ESG}_{j,t}$ is an ESG factor, and $v_i$, $v^{ESG}_j$ are weights. For ease of notation, we alternatively refer $F_{i,t}$ and $F^{ESG}_{j,t}$ as $F^c_{i,t}$ and $v_i$ and $v^{ESG}_j$, as $v^c_i$, i=1, ..., M, M+1, ..., N. Combined return $R_t^c$ is the return during the period t (available at the end of the period) and combined factor $F^c_t$ (and its constituent factors) is available at the beginning of period t (118).

The single period excess return $\alpha_t$ is expressed as a function of the covariance between the combined factor $F^c_t$ and the risk-adjusted combined return $R_t^c$:

$$\alpha_t = \frac{(N-1)}{\lambda_t}\text{cov}(F_t^c, R_t^c)$$

$$= \frac{(N-1)}{\lambda_t}\rho(F_t^c, R_t^c)\sigma(F_t^c)\sigma(R_t^c)$$

The covariance $\text{cov}(F^c_t, R_t^c)$ between the combined factor $F^c_t$ and the risk-adjusted combined return $R_t^c$, is written in term of the correlation $\rho(F^c_t, R_t^c)$ of the combined factor $F^c_t$ and the risk-adjusted combined return $R_t^c$ and the standard deviations $\sigma(F^c_t)$ and $\sigma(R_t^c)$.

The covariance $\text{cov}(F^c_t, R_t^c)$ is expressed as:

$$\text{cov}(F_t^c, R_t^c) = \text{cov}\left(\sum_{i=1}^{M} v_i F_{i,t} + \sum_{j=M+1}^{M} v_j^{ESG} F_{j,t}^{ESG}, R_t^c\right)$$

$$= \sum_{i=1}^{M} v_i \text{cov}(F_{i,t}, R_t^c) + \sum_{j=M+1}^{M} v_j \text{cov}(F_{j,t}^{ESG}, R_t^c)$$

$$= \left[\sum_{i=1}^{M} v_i IC_{i,t}\sigma(F_{i,t}) + \sum_{j=M+1}^{M} v_j^{ESG} IC_{j,t}^{ESG}\sigma(F_{j,t}^{ESG})\right]\sigma(R_t^c)$$

where the information coefficients (IC) are defined as the cross-sectional correlation coefficients:

$$IC_{i,t} = \rho(F_{i,t}, R_t^c)$$

$$IC_{j,t}^{ESG} = \rho(F_{j,t}^{ESG}, R_t^c).$$

The risk-aversion parameter is expressed as:

$$\lambda_t = \frac{\sqrt{N-1}\,\sigma(F_t^c)}{\sigma_{model}}$$

$$\sigma(F_t^c) = \sqrt{v^{cT}\Phi_t^c v^c}$$

where:

$$v^c = [v, v^{ESG}]^T,$$

$$\Phi_t^C = (\Phi_{i,j,t}^c)_{i,j=1}^N, \Phi_{i,j,t}^c = \sigma(F_{i,t}^c, F_{j,t}^c)$$

and $\sigma_{model}$ is the target tracking error, which is proportional to the cross-sectional dispersion of the forecast $\sigma(F^c_t)$ and the square root of the number of stocks N, but inversely proportional to the risk-aversion parameter $\lambda_t$.

Substituting the equation for the risk-aversion parameter $\lambda_t$ into the equation for the single period excess return $\alpha_t$ we have:

$$\alpha_t = IC_t^c \sqrt{N-1}\,\sigma_{model}\sigma(R_t^c)$$

and $$IC_t^c =$$

$$\rho(F_t^c, R_t^c) = \frac{\sum_{i=1}^{N} v_i^c IC_{i,t}^c \sigma(F_{i,t}^c)}{\sqrt{v^{cT}\Phi_t^c v^c}} = \frac{\sum_{i=1}^{M} v_i IC_{i,t}\sigma(F_{i,t}) + \sum_{i=M+1}^{N} v_j^{ESG} IC_{j,t}^{ESG}\sigma(F_{j,c}^{ESG})}{\sqrt{v^{cT}\Phi_t^c v^c}}$$

Assuming time-invariant factor correlation, time-invariant model weight and factors standardized to unit standard deviation $\sigma(F^c_{i,t})=1$ the information coefficient $IC^c_t$ equation becomes as follows (120):

$$IC_t^c = \frac{1}{\tau}\left(\sum_{i=1}^{M} v_i IC_{i,t} + \sum_{j=M+1}^{N} v_j^{ESG} IC_{j,t}^{ESG}\right)$$

$$\tau = \sqrt{v^{c,T}\Phi^c v^c}$$

With the above-mentioned assumptions the average and standard deviation of the composite information coefficient become:

$$\overline{IC^c} = \frac{1}{\tau}\left(\sum_{i=1}^{M} v_i \overline{IC_i} + \sum_{j=M+1}^{N} v_j^{ESG} \overline{IC_j^{ESG}}\right)$$

$$= \frac{1}{\tau} v^T \overline{IC}$$

$$\sigma(IC^c) = \frac{1}{\tau}\sqrt{v^{cT} \sum_{IC}^{c} v}$$

where:

$$\overline{IC} = \left(\overline{IC_1}, \ldots, \overline{IC_M}, \overline{IC_{M+1}^{ESG}}, \ldots, \overline{IC_N^{ESG}}\right)^T$$

$$\sum_{IC}^{c} = (\rho_{i,j,IC}^c)_{i,j=1}$$

and $\rho$, is a time-series covariance of factors $F^c_i$ and $F^c_j$'s IC.

The information ratio (IR) that compares the manager's excess returns to the amount of risk is the ratio of the average IC to the standard deviation of the IC:

$$IR^c = \frac{\overline{IC^c}}{\sigma(IC^c)} = \frac{v^T \overline{IC}}{\sqrt{v^{cT} \sum_{IC}^{c} v}}$$

The optimal weights v* are calculated by taking the derivative of the $IR^c$ equation and setting the derivative equal to zero, since this is an unconstrained optimization.

$$\frac{\partial (IR^c)}{\partial v} = \frac{\overline{IC}}{\sqrt{v^T \sum_{IC}^{c} v}} - \frac{(v^T \overline{IC})\sum_{IC}^{c} v}{\left(v^T \sum_{IC}^{c} v\right)^{3/2}}$$

$$v^* = s \sum_{IC}^{C_c-1} \overline{IC}$$

where s is an arbitrary scalar (122).

The optimal IR*, using the optimal weight v* is:

$$IR^* = \sqrt{\overline{IC}^T \sum_{IC}^{c_c-1} \overline{IC}}$$

Some practical considerations include the following. The time-invariant factor correlation and weight do not really hold in practice. For practical implementations, we use a rolling window to estimate the correlation and optimize accordingly. Even through s can be any arbitrary scalar, in practice we choose it so that the weights sum up to 1. The scalar parameter γ can be used to tune how much do we want to tilt toward ESG factors $F^{ESG}_i$ in the portfolio. For example, if we want to split the model evenly between alpha and ESG factors, then we set γ such that:

$$\sum_{i=1}^{M} v_i = \sum_{j=M+1}^{N} v_j^{ESG} = 0.5$$

In practice, we use slightly modified combined return:

$$R_t^c = (1-\eta)R_t + \eta \gamma R_t^{ESG}$$

where γ is still used to scale ESG measure to the same range as stock returns for a given time period, and η is between 0 and 1 and is used to choose the portfolio's ESG tilt. The above mentioned framework is agnostic to the ESG measure used. As long as the measure can be translated to a numeric score, the framework will work. In practice we use numerical ESG measures in the same range as stock returns, for a given return horizon.

Figure 5:
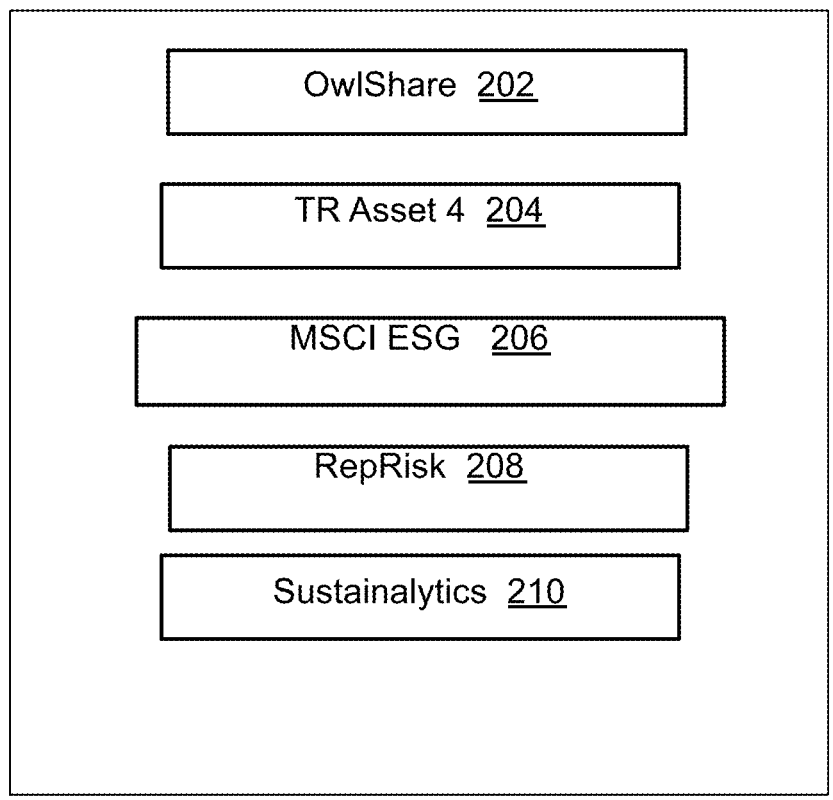
FIG. 5 depicts a list of examples of third party ESG Vendors.

The ESG vendor data 82 are provided by industry recognized ESG vendors. Examples of these ESG vendors include OwlShare, TR Asset4, MSCI ESG, RepRisk, and Sustainalytics, among others, as shown in FIG. 5.

Figure 6:
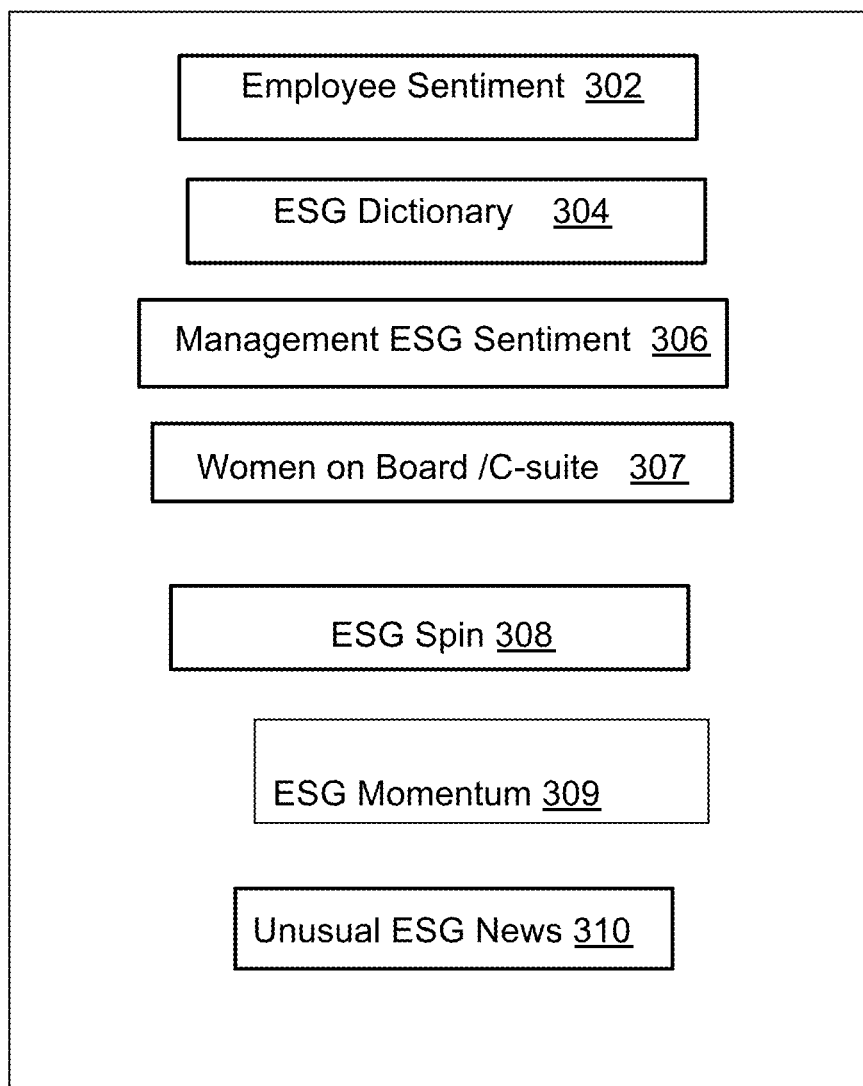
FIG. 6 depicts a list of examples of internally developed PanAgora specific ESG factors.

The PanAgora ESG data 84 are additional ESG data that are developed internally, as will be described below. Examples of the PanAgora ESG data 84 include Employee Sentiment 302, ESG Dictionary 304, Management ESG Sentiment 306, Women on Board/C-suite 307, ESG Spin 308, ESG Momentum 309, and Unusual ESG News 310, as shown in FIG. 6.

Figure 7A:
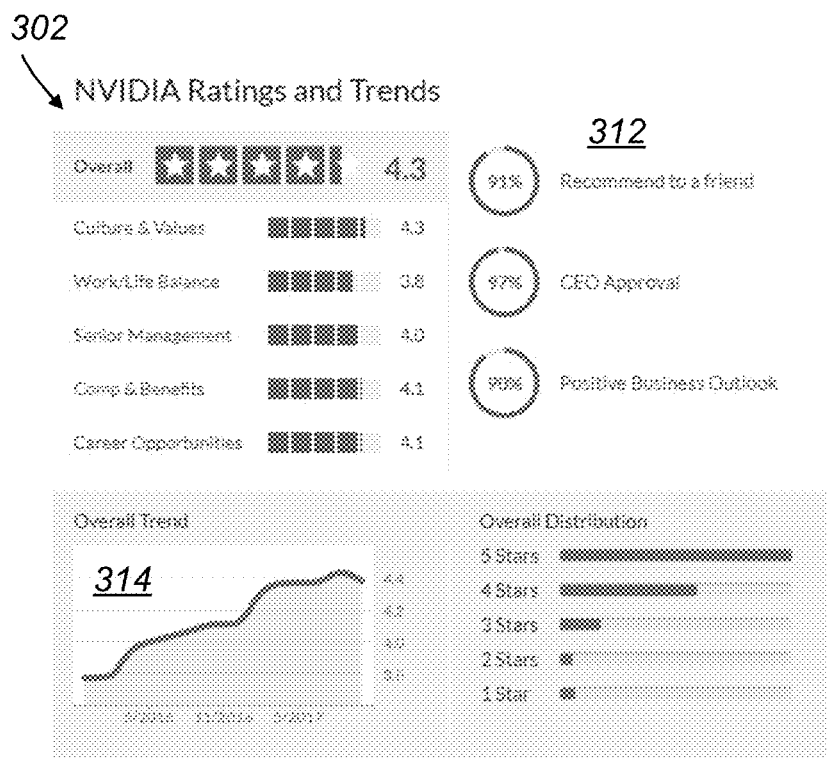
FIG. 7A depicts employee sentiment data for Nvidia extracted from the web.
Figure 7B:
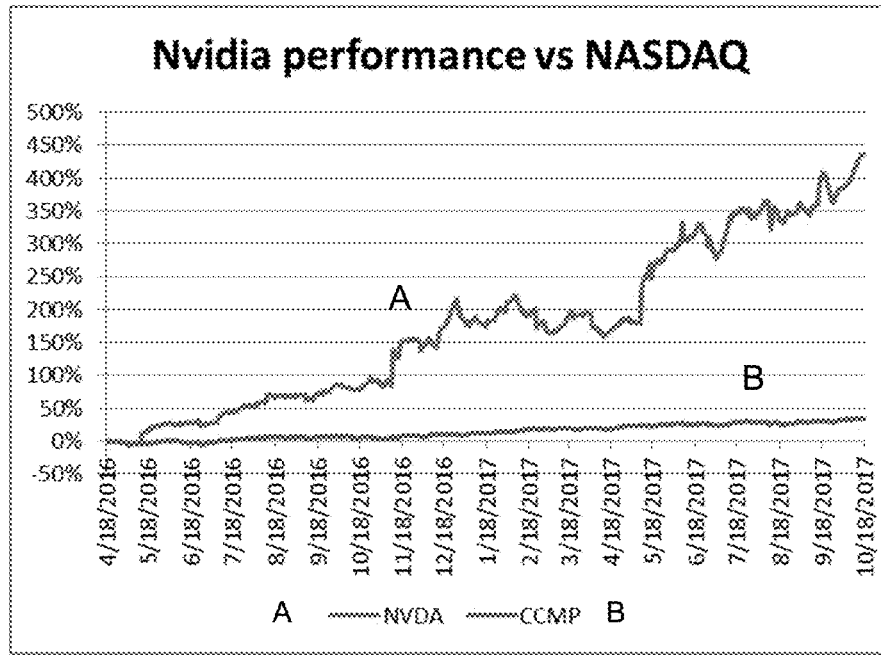
FIG. 7B is a plot of Nvidia share price over a period of time.
Figure 8:
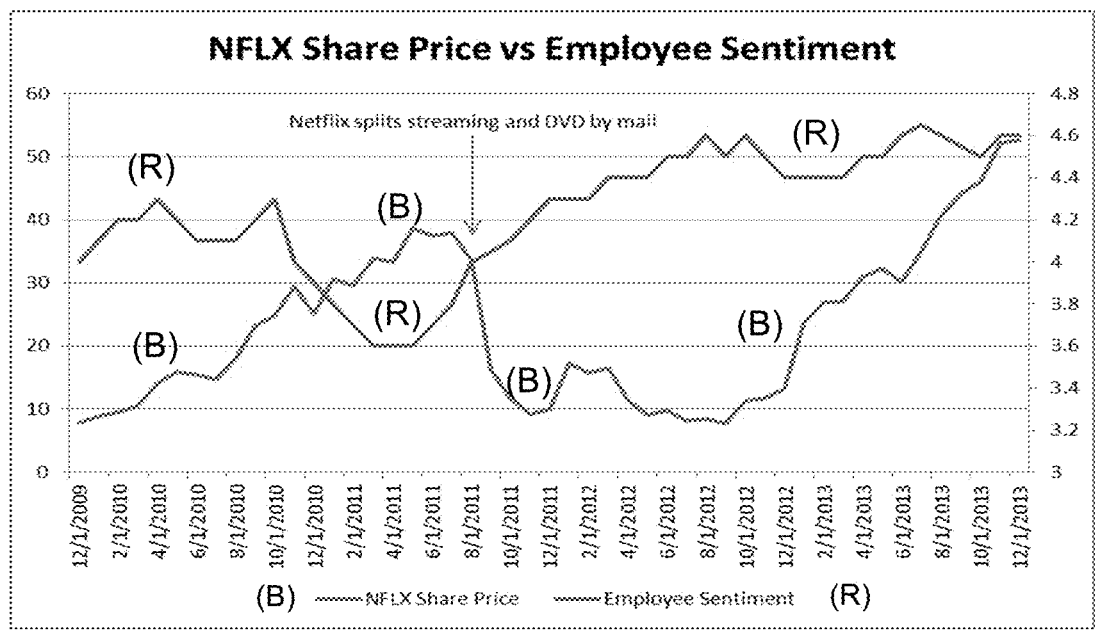
FIG. 8 is a plot of the employee sentiment data and the stock performance for Netflix over the same time period.

Numerous studies have shown that happier employees are more productive, creative, and overall have fewer turnovers. Disgruntled employees on the other hand can make workplace toxic, leading to lower productivity. Employee sentiment 302 provides an inside view of a company, and can be a leading indicator of the firm's financial performance. Employee sentiment data 302 are collected using web-scraping techniques to "read" millions of direct comments from employees on their thoughts of management, how likely they are to recommend their company to a friend, and their overall job satisfaction. Referring to FIG. 7A, the employee sentiment 302 for Nvidia Company is extracted via web-scraping from websites such as Glassdoor.com. The employee sentiment rating 312 is based on questions about culture and values, work/life balance, senior management, compensation and benefits and career opportunities. A statistical overall average rating 314 is plotted for a given time period. The Nvidia stock performance (A) follows the same upward trend as the employee sentiment rating 302 for the same time period, as shown in FIG. 7B. The employee sentiment (R) and the share price for Netflix (NFLX) plotted over the same time period are shown in FIG. 8. It is shown that the split of the streaming business and the DVD by mail business increased the employee sentiment (R) and eventually increased the overall stock performance (B).

Figures 9A, 9B, 9C:
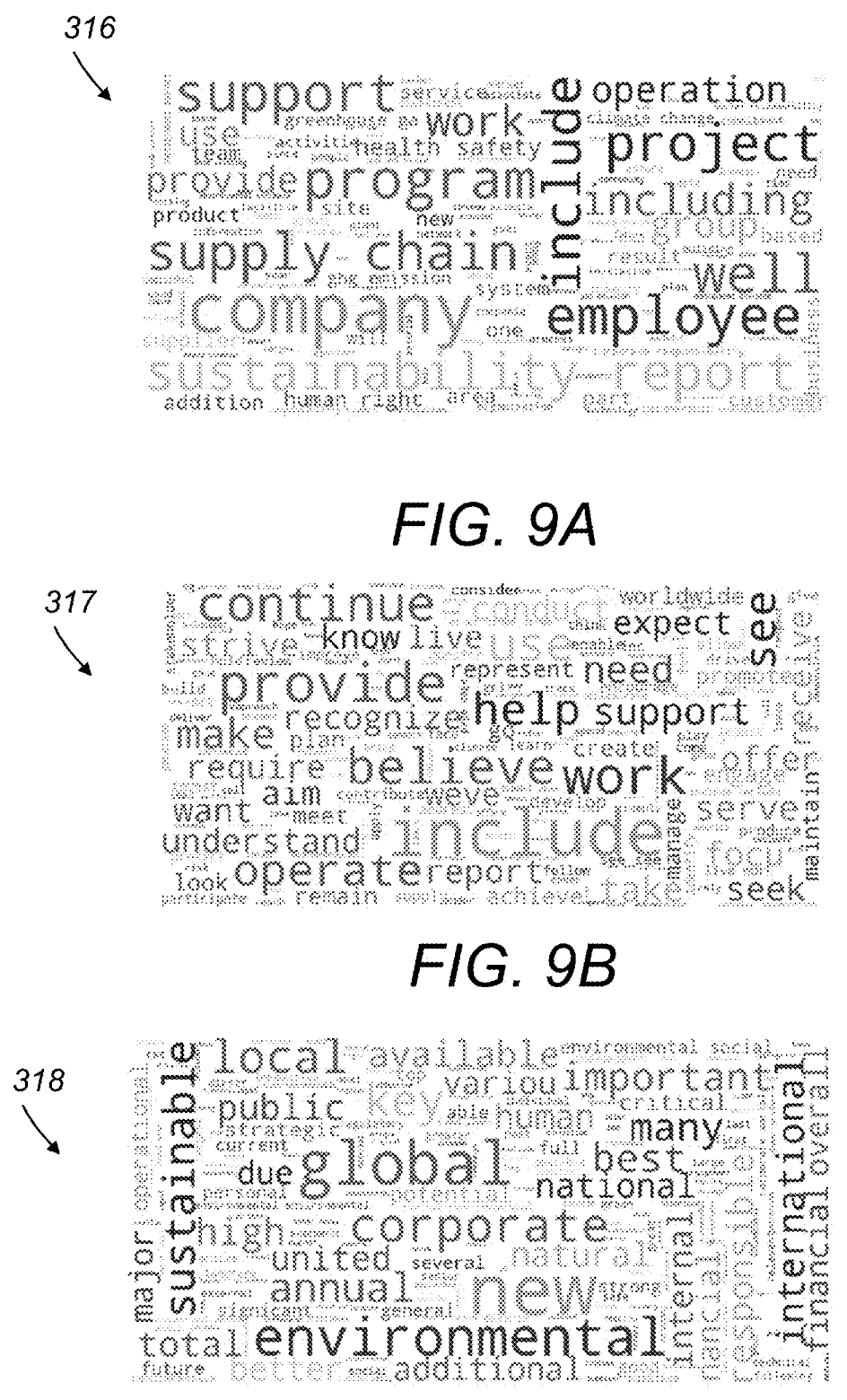
Figure 10:
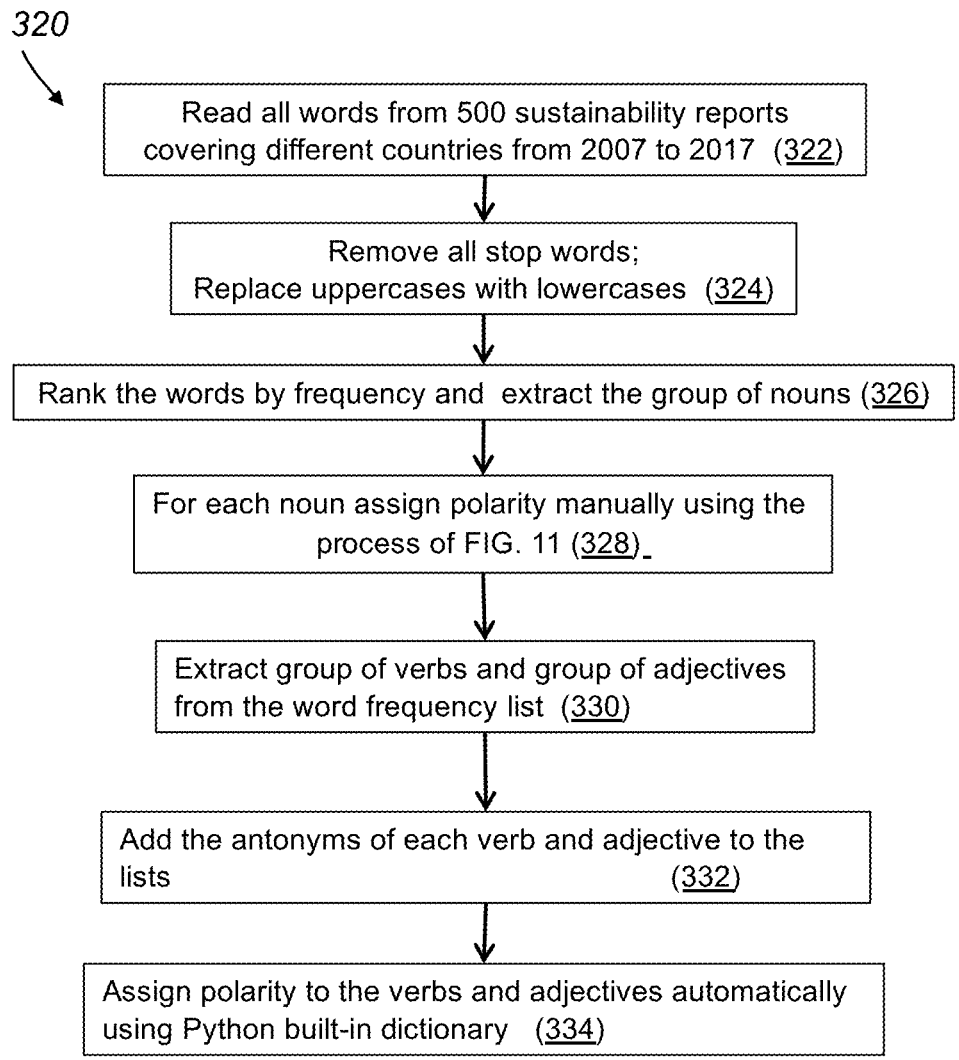
FIG. 10 depicts a flow diagram for the process of constructing the ESG Dictionary.
Figure 11:
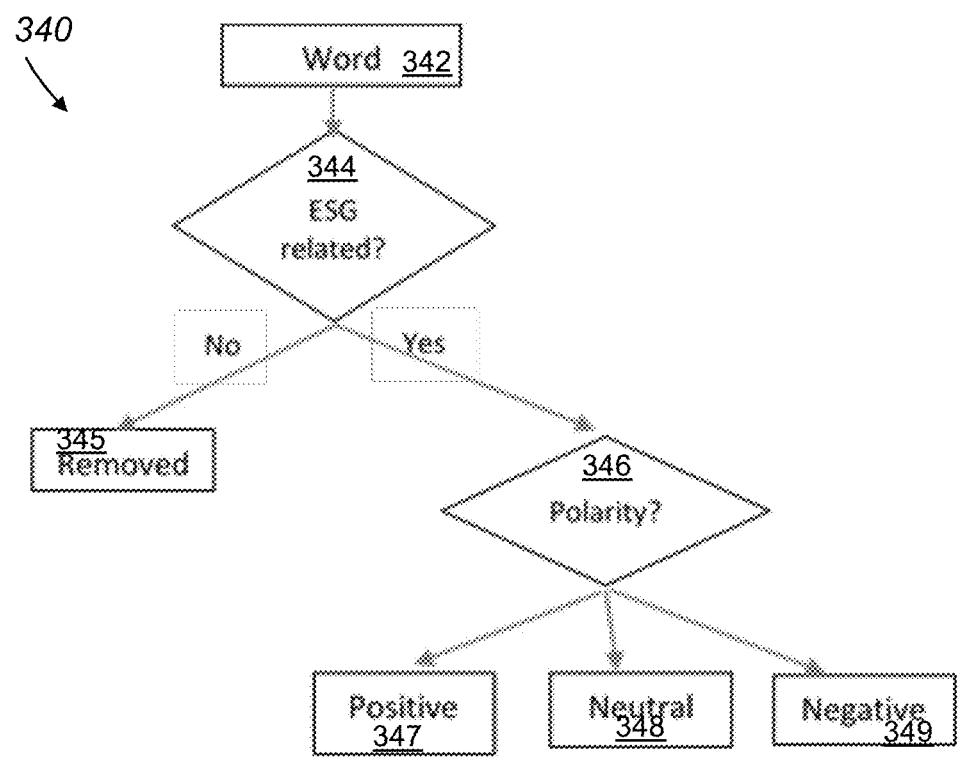
FIG. 11 depicts a flow diagram for the process of assigning polarity to the nouns in the ESG Dictionary.

Referring to FIG. 10, an internal ESG dictionary 304 is constructed using the following process 320. First, we read words from 500 sustainability report covering different countries from 2007 to 2017 (322). Next, we remove all stop words and replace uppercases with lowercases (324). Next, we rank the words by occurrence frequencies. We then extract a group of nouns 316, shown in FIG. 9A (326). Next, we assign polarity to each noun in the group manually using the process of FIG. 11 (328). Next, we extract a group of verbs 317 and a group of adjectives 318, shown in FIG. 9B and FIG. 9C, respectively (330). Next, we add the antonyms of each verb and adjective to the lists, since most of the verbs and adjectives are positive (332). Next, we assign polarity to each verb and adjective automatically, using a Python built-in dictionary (334). Referring to FIG. 11, the manual process 340 of assigning polarity to ESG nouns includes the following. First, each word (i.e., noun) is entered in the dictionary (342) and then the word is checked to see if it is ESG related (344). If the noun is not ESG related, it is removed (345). If the noun is ESG related, polarity is assigned (346). Three polarity groups are constructed, i.e., positive (347), neutral (348) and negative (349).

Management behavior insights are also used to develop ESG-alpha factors. As an example, there is a common behavioral tendency for C-Suite executives to avoid disclosing negative news too early. As a result of this behavioral tendency, we verified that upon disclosure of negative ESG news, companies tend to work to remedy their ESG related issue, and this results in improved ESG alpha factors. Furthermore, the act of disclosing ESG related issues indicates that ESG is important to a firm's management. Management ESG Sentiment 306 is constructed by developing an internal ESG dictionary 304, reading through millions of companies' internal corpus to identify and assign relevant ESG information using natural language processing (NLP) techniques, and then applying machine learning techniques to access the relative impact of ESG comments.

Figure 12A:
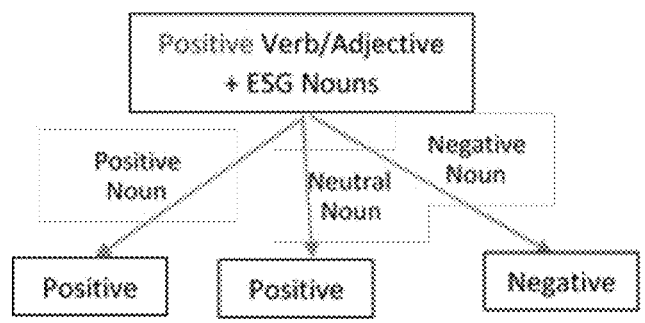
FIG. 12A depicts the rule for assigning polarity to the combinations of positive verb/adjective with a noun.
Figure 12B:
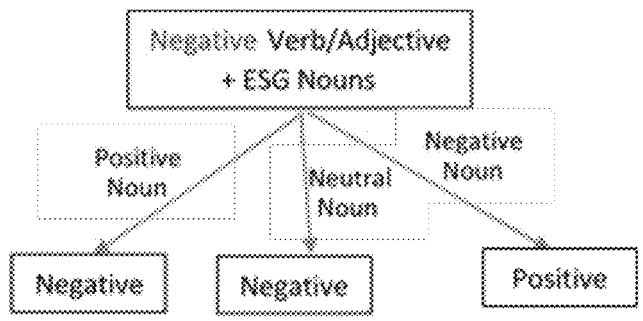
FIG. 12B depicts the rule for assigning polarity to the combinations of negative verb/adjective with a noun.
Figure 13:
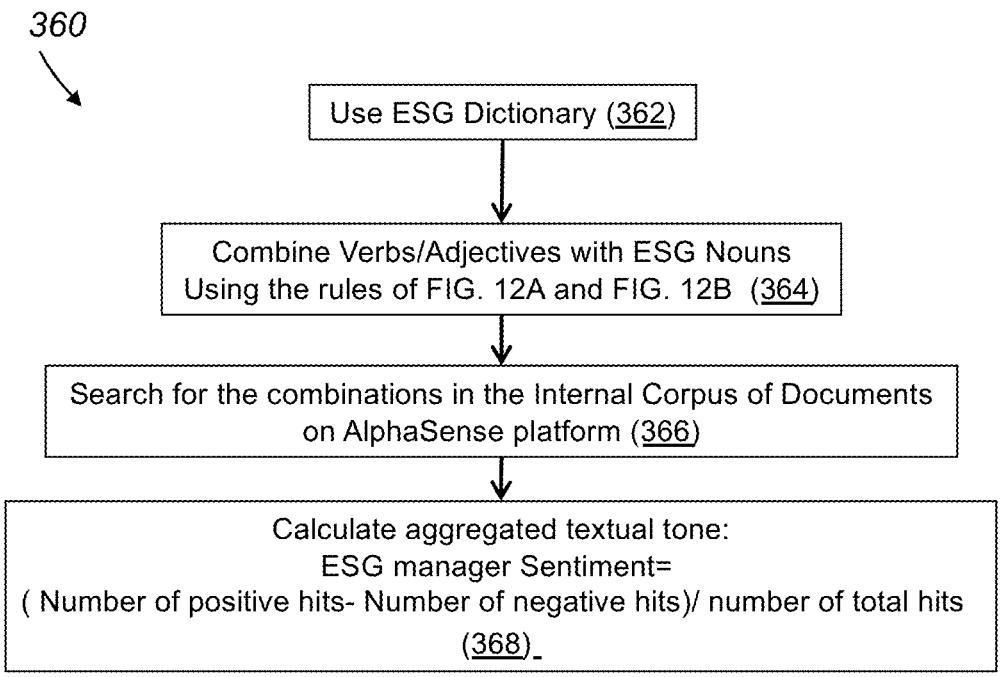
FIG. 13 depicts a flow diagram for calculating ESG manager sentiment.

Referring to FIG. 13, the process for constructing an ESG manager sentiment 360 includes the following. We use the ESG dictionary (362) and we combine verbs or adjectives with ESG nouns using the rules shown in FIG. 12A and FIG. 12B (364).

Figure 14:
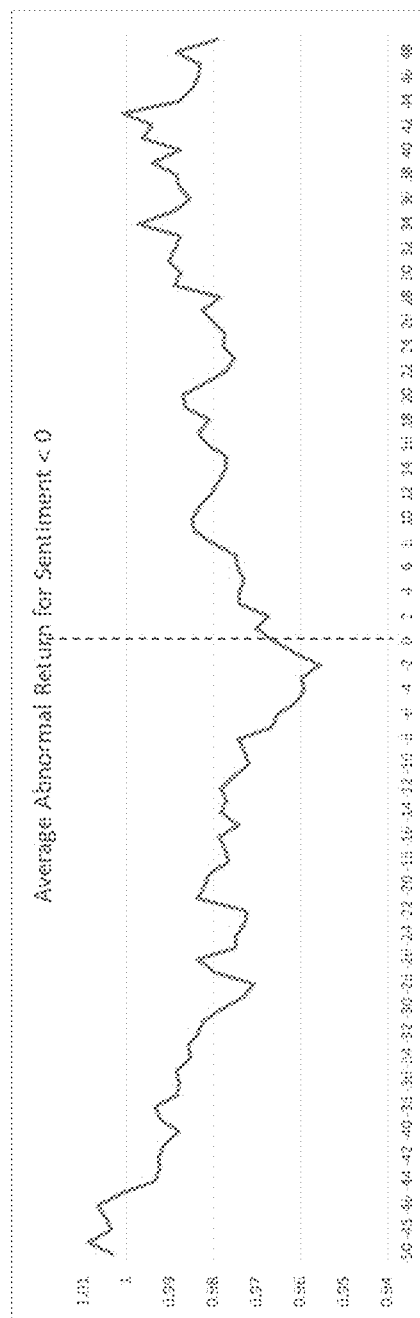
FIG. 14 is a graph of the average cumulative returns for companies as a function of the time of disclose of negative news.

According to the rule 350a in FIG. 12A, a positive verb/adjective combined with a positive ESG noun is positive, a positive verb/adjective combined with a neutral ESG noun is positive and a positive verb/adjective combined with a negative ESG noun is negative. According to the rule 350b in FIG. 12B, a negative verb/adjective combined with a positive ESG noun is negative, a negative verb/adjective combined with a neutral ESG noun is negative, and a negative verb/adjective combined with a negative ESG noun is positive. Next, we search for the derived combinations in the corpus of internal documents that can be found on AlphaSense platform (366). Examples of these internal documents include internal documents such as 10K, 10Q, event transcripts such as earning calls, company presentations and press releases, among others. Next, we aggregate the number of positive hits and number of negative hits and we calculate the ESG manager sentiment using the following equation (368):

ESG Manager Sentiment=(Number of positive hits− Number of negative hits)/number of total hits As was mentioned above, ESG Management Sentiment negatively predicts future stock returns. Managers have incentives to immediately reveal good news to investors, but accumulate and withhold bad news up to a certain threshold. When the managers are forced to disclose bad news, things are likely bottomed out and therefore we can bet on stock price reversal after the disclosure of bad news. Referring to FIG. 14, the average cumulative returns for companies is plotted as a function of the time of disclose of negative news. The time of disclose of negative news or when the manager ESG sentiment is negative is set to zero point on the horizontal axis. The horizontal axis extends from 50 days before to 50 days after the date when the negative news are disclosed. We observe that the average cumulative returns for companies decrease before the disclosure of the negative news (i.e., time zero) and then increases.

Figure 15:
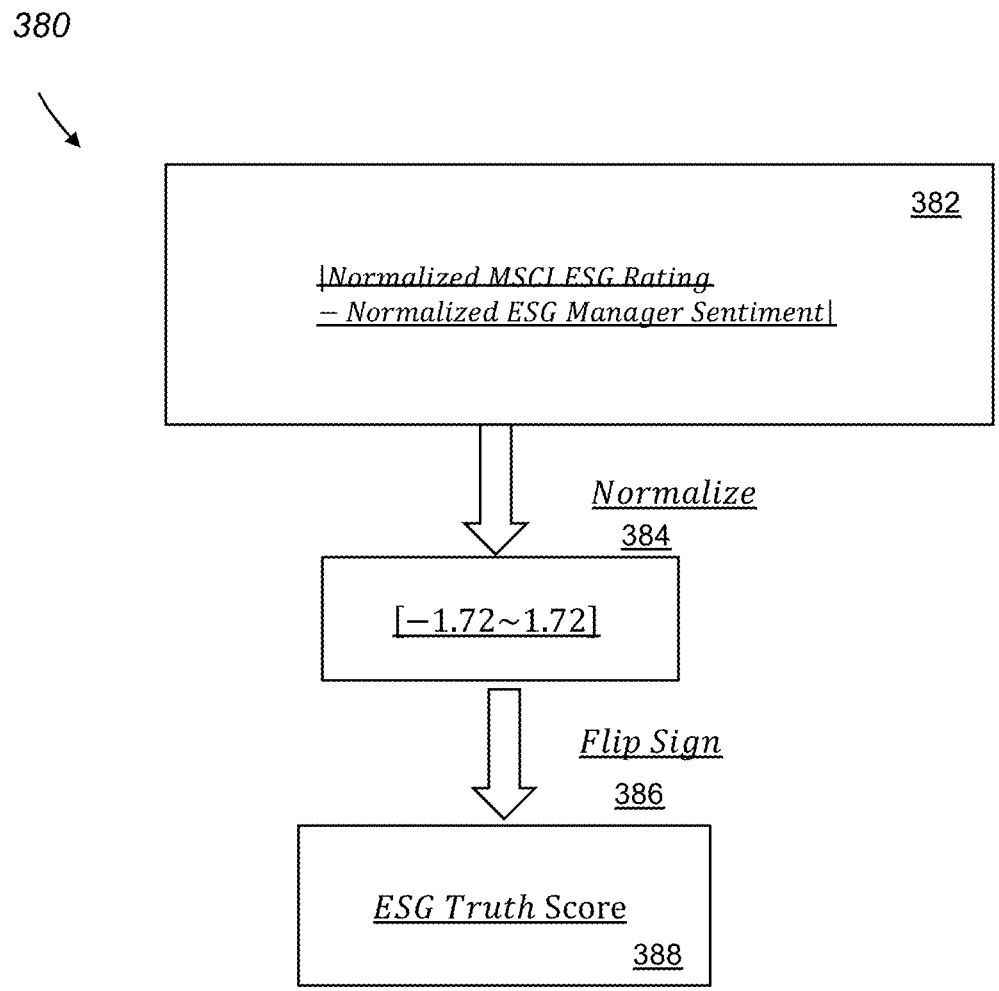
FIG. 15 is a flow diagram for the process of calculating the ESG Spin factor.

The ESG Spin/Truth factor 308 is the difference between the externally provided ESG score (such as MSCI ESG rating) and the ESG manager sentiment. The ESG Spin/Truth factor 308 is a measure of a company's opaqueness on ESG issues. Referring to FIG. 15, the process 380 of calculating the ESG Spin factor 308 includes the following. We take the normalized third party ESG rating (e.g., MSCI ESG rating) and subtract the normalized ESG manager sentiment (382). Next, we normalize the result (384), we flip the sign (386) and we obtain the ESGSpin/Truth score (388).

Figure 16:
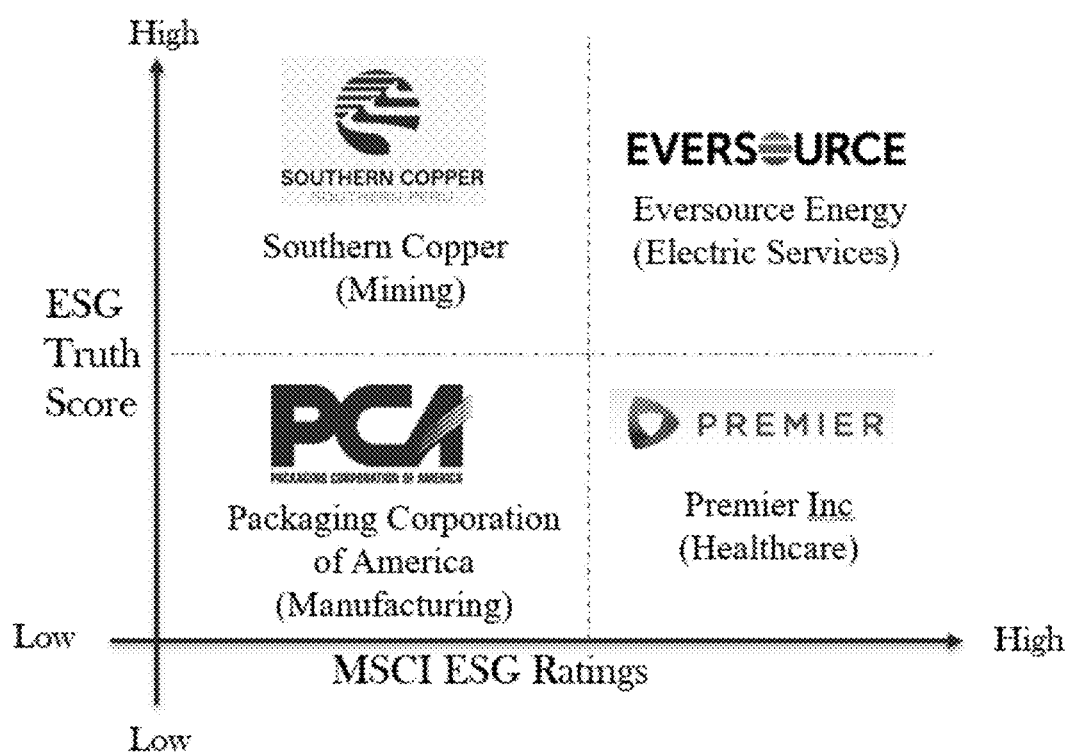
FIG. 16 depicts examples of companies with high/low Truth scores.

An ESG Spin is indicated when the third party ESG rating is low while the ESG manger sentiment is high. ESG Truth is indicated when the third party ESG rating is consistent with the ESG manger sentiment. Examples of companies with high/low Truth scores are shown in FIG. 16.

Figure 17A:
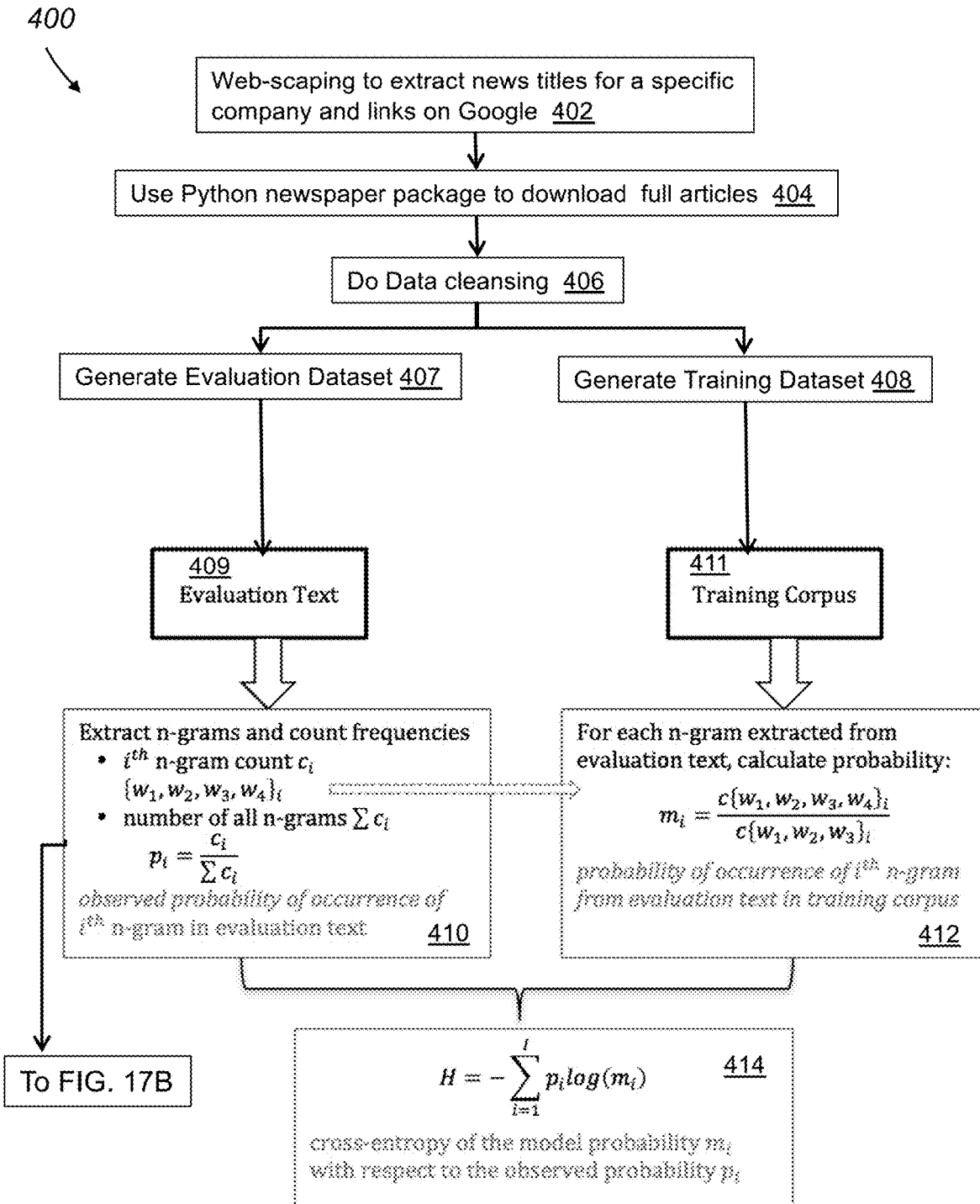

Increase in unusual ESG news 310 is also a factor that affects future stock performance. In particular, increase in the "unusualness" of news coupled with negative sentiment may predict a decrease in company stock price. In one example, while researching Volkswagen AG in September 2015, the terms "emissions tests", "fraud allegations against" and "to cheat exhaust emissions" occurred more frequently than in previous years. In another example, for Glasserman and Mamaysky 2017 up until October 2011, the phrase "negative outlook on" had appeared 688 times always followed by "any". In October 2011 we observed 13 occurrences of the phrase "negative outlook on France". A measure of the "unusual ESG news factor" 310 is constructed using the process 400 of FIG. 17A and FIG. 17B. We start by web-scraping to extract news titles about a company and links on websites such as Google News platform (402). Google News platform has 4500 sources including both traditional news websites and blogs. Next, we use Python newspaper package to download relevant full articles (404). We do data cleansing (406) and we generate evaluation datasets (407) and training datasets for each holding period (408). For monthly time-periods, the evaluation datasets include all the news texts for the current month and the training datasets include all the news text for the previous two years. For each evaluation dataset (409) we extract n-grams and count frequencies ($i^{th}$ n-gram count $c_i$). An n-gram is a specified sequence of n words. There are n-grams that occur frequently in the current news (i.e., in the evaluation dataset), but rarely in previous news (i.e., training dataset), as is the case for the Volkswagen AG and the Glasserman and Mamaysky examples. We calculate the observed probability of occurrence of the $i^{th}$ n-gram in the evaluation text by using the following equation (410):

$$p_i = c_i / \Sigma c_i$$

For each $i^{th}$ n-gram extracted from the evaluation text we calculate the probability of occurrence of the $i^{th}$ n-gram in the training dataset (411) using the following equation (412):

$$m_i = c\{w_1, w_2, w_3, w_4\}_i / c\{w_1, w_2, w_3\}_i$$

Next we calculate the cross-entropy of the model probability $m_i$ with respect to the observed probability $p_i$ using the following equation (414):

$$H = -\Sigma p_i \log(m_i) \text{ for } (i=1 \text{ to } I)$$

For each $i^{th}$ n-gram extracted from the evaluation text we assign polarity (416). The polarity of the n-gram is positive if there is at least one positive word and no negative word. The polarity of the n-gram is negative if there is at least one negative word and no positive word. Next, we calculate the positive sentiment, the negative sentiment and the overall sentiment score (418) using the following equations:

Positive Sentiment=Number of positive n-grams/total number of n-grams

Negative Sentiment=Number of negative n-grams/ total number of n-grams

Sentiment=(Number of positive n-grams−Number of negative n-grams)/total number of n-grams The unusualness factor is the sum of the cross-entropy H and the Sentiment score (420).

Figure 18A:
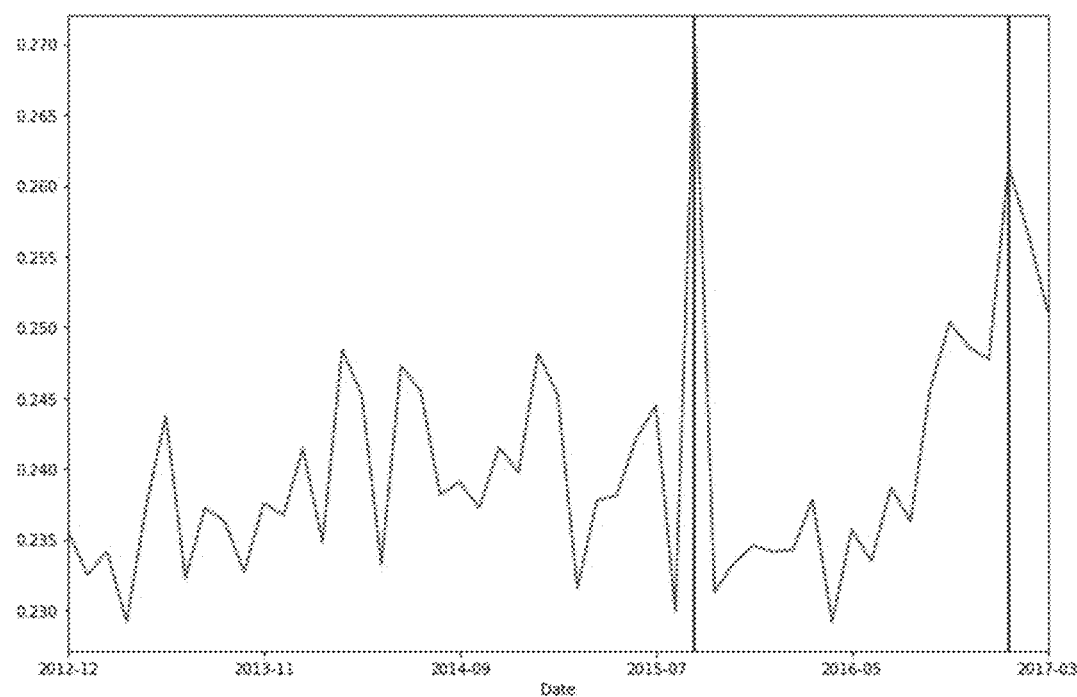
FIG. 18A is a graph of the unusualness factor for the Volkswagen AG case.
Figure 18B:
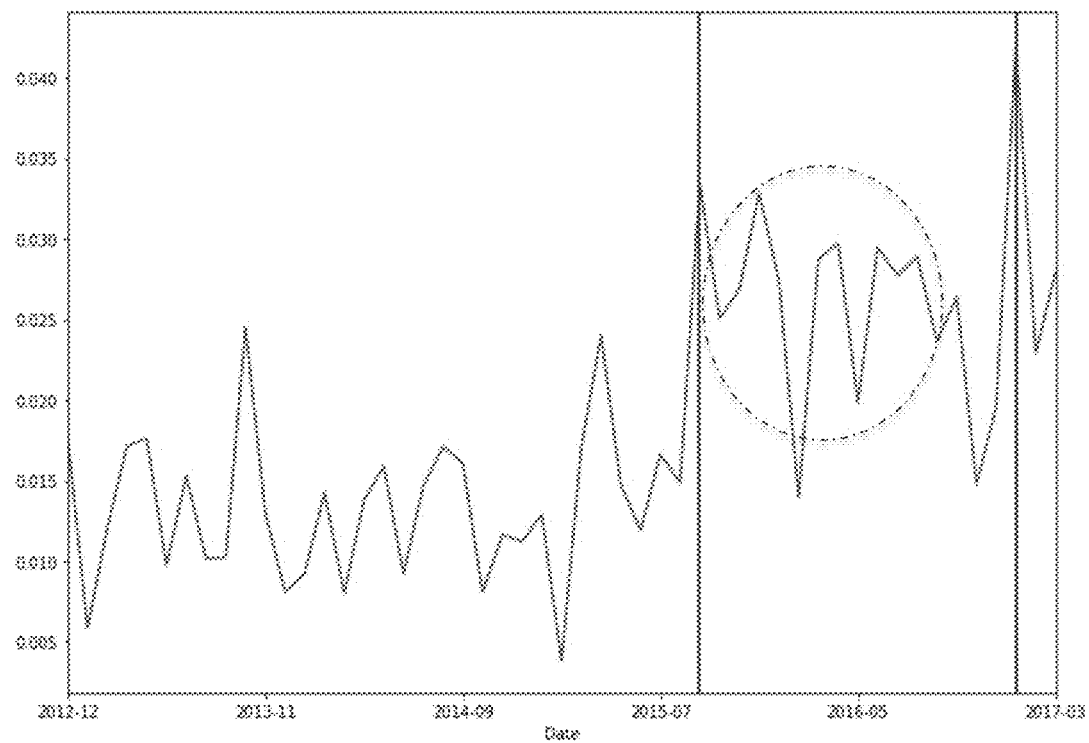
FIG. 18B is a graph of the negative sentiment score for the Volkswagen AG case.

We used this methodology to calculate the unusualness factor and the negative sentiment score for the above mentioned Volkswagen AG case, as shown in FIG. 18A and FIG. 18B, respectively. The Volkswagen AG emission scandal started on Sep. 18, 2015 when the United States EPA issued a notice of violation of the Clean Air Act to Volkswagen AG. Examples of n-grams include: "government fines and settlement", "to cheat exhaust emission", "into fraud allegations against". In January 2017, Volkswagen AG set to plead guilty and confirmed a $4.3 billion settlement deal over emission scandal. Examples of n-grams include: "pleaded guilty to criminal", "confirm billion settlement and".

Figure 19A:
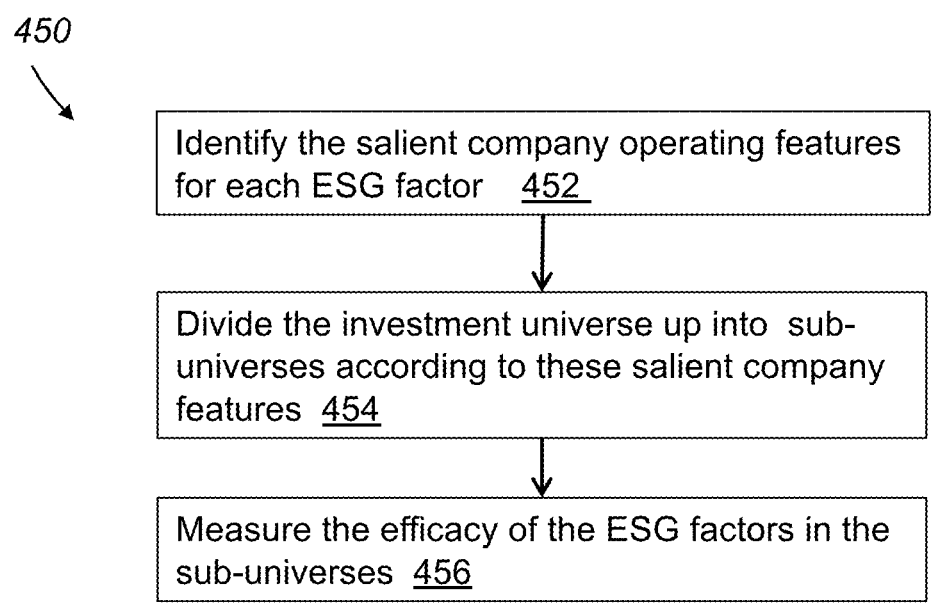
FIG. 19A depicts the process of establishing materiality of ESG alpha factors through contextualization in order to determine which ESG-alpha factors are most relevant to each company.
Figure 19B:
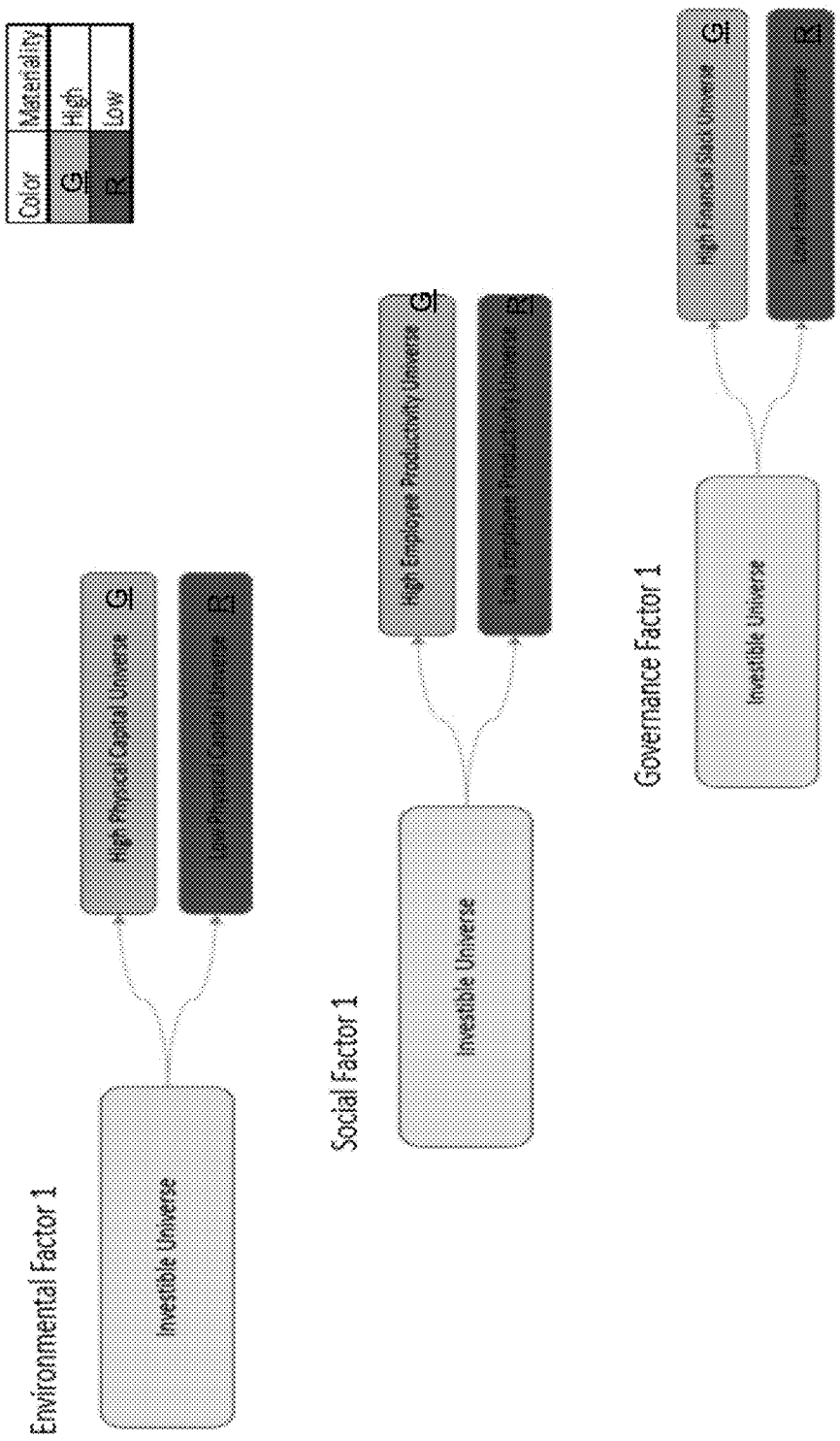
FIG. 19B depicts ESG-alpha factors and the corresponding sub-universes of the investible universe.

Materiality of the ESG factors varies across companies. Environmental issues are important to industrial companies, and not as important to professional service companies. While employee satisfaction is important to professional service companies and not as important to utilities. The common approach to identifying materiality is to segment companies by industry. However, we have discovered this is not the most ideal method to measure materiality. We use the concept of Contextual Modeling which identifies the power of factors such as value, quality, and momentum have different efficacy across various risk contexts. We have applied this technology across the suite of ESG-alpha factors to evaluate materiality of ESG-alpha factors through contextualization and determined which ESG-alpha factors are most relevant to each company. This process cuts through industry group and can identify differences across companies within an industry. For example, Netflix and Yum! Brands are both in the consumer discretionary sector however relevant ESG-alpha (and standard alpha) factors are clearly different for the two companies. The salient company characteristics are used to figure out the important ESG factors for each company, as shown in the process 450 of FIG. 19A. First, we identify the salient company operating features for each ESG factor (452) and then divide the investment universe up according to these salient company features (454), and then we measure the efficacy of the ESG factors in the sub-universes (456). For example, for pollution mitigation, which matters for firms with large installed plants and equipment, we classify firms according to their ratio of Plants Property and Equipment (PP&E) to Total Assets (TA), and divide the investible universe into high and low universes. We then test the efficacy of pollution ESG factor on the sub-universes separately to determine its efficacy and subsequently weight in the combined ESG model. FIG. 19B depicts ESG-alpha factors and the corresponding sub-universes of the investible universe. As was described above, for environmental factor 1, we classify companies according to their ratio of Plants Property and Equipment (PP&E) to Total Assets (TA), and divide the investible universe into high physical capital universe and low physical capital universe. For social factor 1, the division of the investible universe is into high employee productivity universe and low employee productivity universe. For governance factor 1, the division of the investible universe is into high financial slack universe and low financial slack universe.

Figure 20:
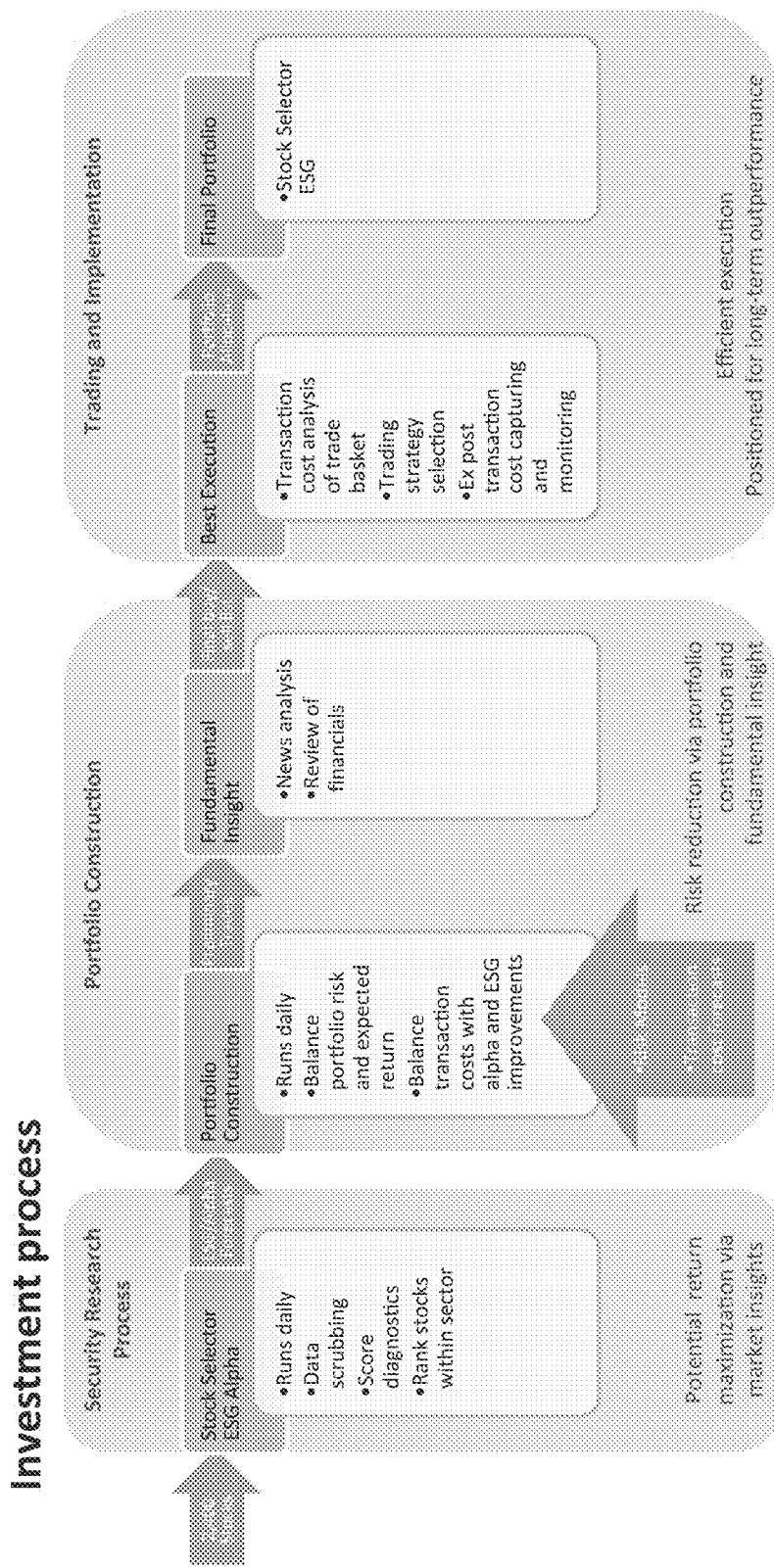
FIG. 20 depicts the overall investment process using the method of constructing ESG investment portfolios, according to this invention.
Figure 21:
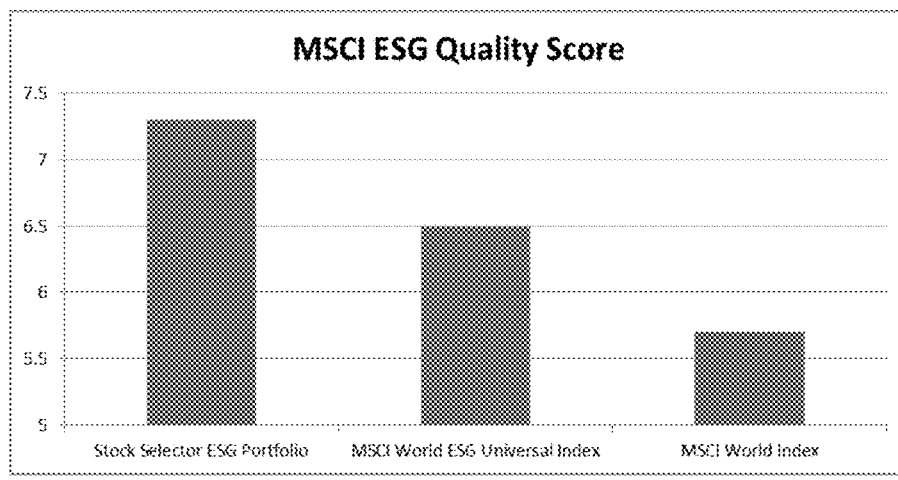
FIG. 21 depicts the ESG performance of an example of an ESG investment portfolio constructed according to the methodology of this invention.

The ESG characteristics of the investment portfolios that are constructed using the above mentioned methodology is measured and reported versus the benchmark, using the client's preferred ESG metric $R_f^{ESG}$. In addition, the investment portfolios return is also measured and reported versus the stated benchmark (MSCI World). The over/under performance along both alpha and ESG dimensions is quantified, and is reported on a regular and live basis. Large ESG score detractors can be drilled down into specific ESG incidents driving down the score, and can be attributed to individual ESG factor in the model. The overall investment process using the method of constructing ESG investment portfolios, according to this invention is shown in FIG. 20. The ESG performance of an example of an ESG investment portfolio constructed according to the methodology of this invention is shown in FIG. 21. It is shown that the Stock Selector ESG portfolio ranks better on the ESG front than both its benchmark (MSCI World Index) and the MSCI World ESG Universal Index, as measured by MSCI ESG.

Figure 22:
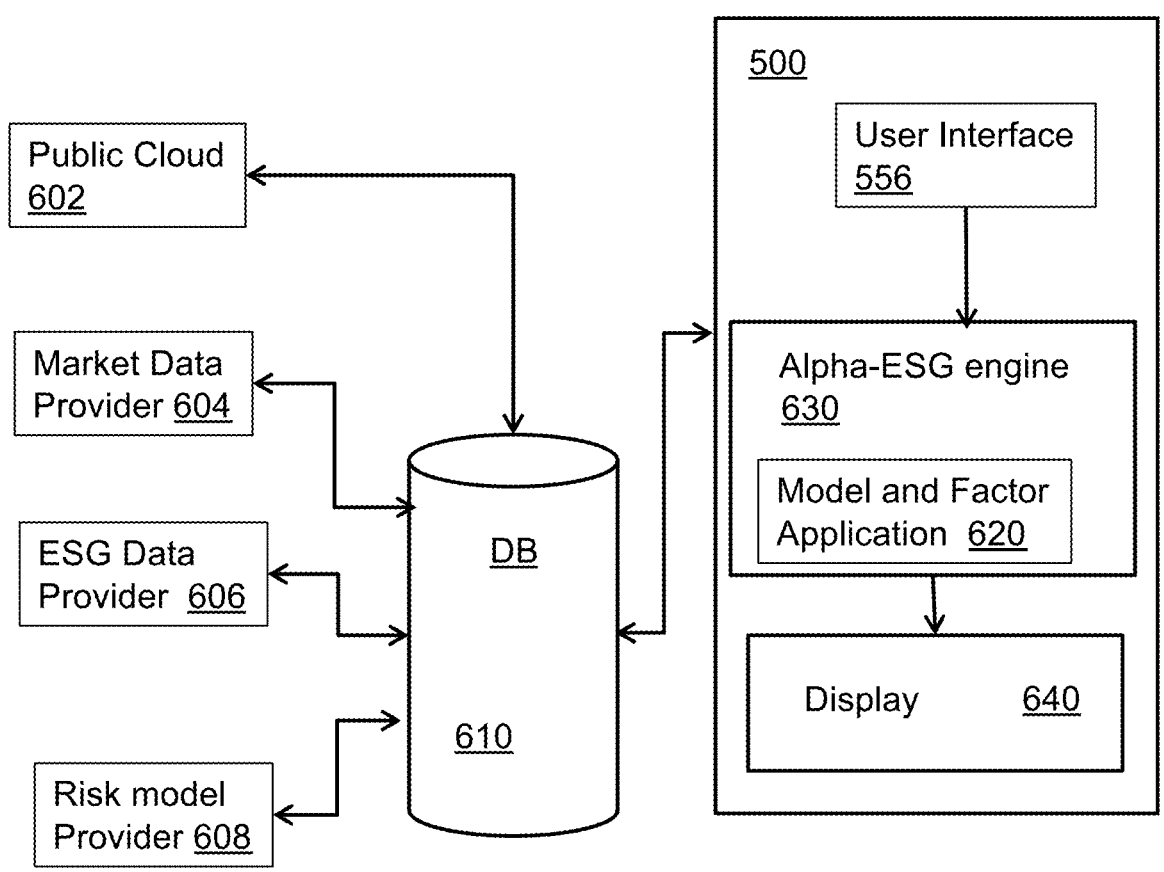
FIG. 22 depicts an exemplary computing system architecture 600 for implementing the system of the present invention.

Referring to FIG. 22, an exemplary system architecture 600 for implementing the system of the present invention includes a computing system 500 that receives inputs from database 610. Database 610 receives data inputs from the public cloud 602, market data providers 604, ESG data providers 606 and risk model providers 608. The data from the database 610 are entered into the alpha-ESG optimization engine 630 and are used as inputs for the alpha-ESG model and factor application 620. The alpha-ESG optimization engine 630 operates in the computing system 500 and also receives client specific inputs via a user interface (UI) 556. The alpha-ESG optimization results are displayed on display 640.

Figure 23:
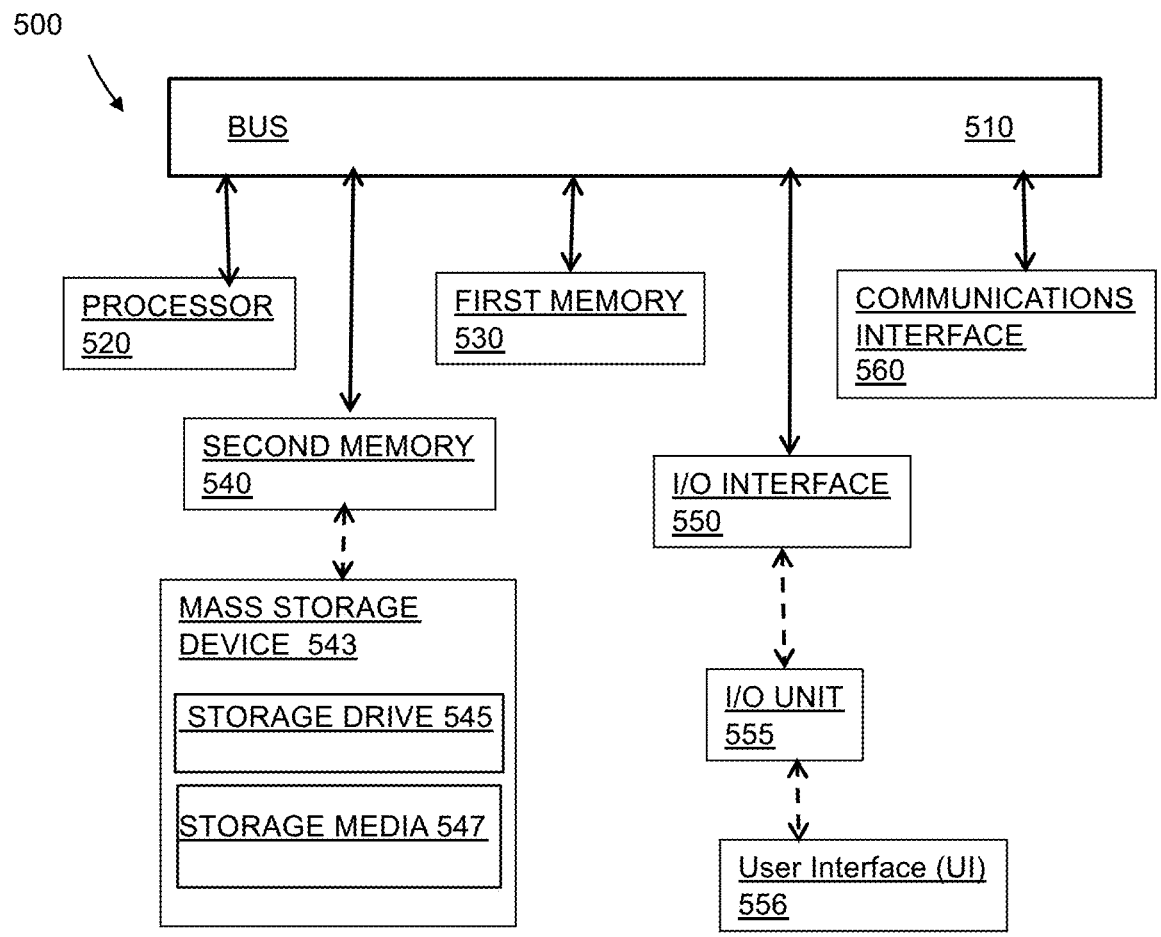
FIG. 23 is a schematic diagram of an exemplary computer system 500 that is used to implement the system of the present invention.

Referring to FIG. 23, an exemplary computer system 500 or network architecture that may be used to implement the system of the present invention includes a processor 520, first memory 530, second memory 540, I/O interface 550 and communications interface 560. All these computer components are connected via a bus 510. One or more processors 520 may be used. Processor 520 may be a special-purpose or a general-purpose processor. As shown in FIG. 20, bus 510 connects the processor 520 to various other components of the computer system 500. Bus 510 may also connect processor 520 to other components (not shown) such as, sensors, and servomechanisms. Bus 510 may also connect the processor 520 to other computer systems. Processor 520 can receive computer code via the bus 510. The term "computer code" includes applications, programs, instructions, signals, and/or data, among others. Processor 520 executes the computer code and may further send the computer code via the bus 510 to other computer systems. One or more computer systems 500 may be used to carry out the computer executable instructions of this invention.

Computer system 500 may further include one or more memories, such as first memory 530 and second memory 540. First memory 530, second memory 540, or a combination thereof function as a computer usable storage medium to store and/or access computer code. The first memory 530 and second memory 540 may be random access memory (RAM), read-only memory (ROM), a mass storage device, or any combination thereof. As shown in FIG. 20, one embodiment of second memory 540 is a mass storage device 543. The mass storage device 543 includes storage drive 545 and storage media 547. Storage media 547 may or may not be removable from the storage drive 545. Mass storage devices 543 with storage media 547 that are removable, otherwise referred to as removable storage media, allow computer code to be transferred to and/or from the computer system 500. Mass storage device 543 may be a Compact Disc Read-Only Memory ("CDROM"), ZIP storage device, tape storage device, magnetic storage device, optical storage device, Micro-Electro-Mechanical Systems ("MEMS"), nanotechnological storage device, floppy storage device, hard disk device, USB drive, among others. Mass storage device 543 may also be program cartridges and cartridge interfaces, removable memory chips (such as an EPROM, or PROM) and associated sockets.

The computer system 500 may further include other means for computer code to be loaded into or removed from the computer system 500, such as the input/output ("I/O") interface 550 and/or communications interface 560. The computer system 500 may further include a user interface (UI) 556 designed to receive input from a user for specific parameters, such as user defined ESG factor to be used to optimize the investment portfolio. Both the I/O interface 550 and the communications interface 560 and the user interface 556 allow computer code and user input to be transferred between the computer system 500 and external devices including other computer systems. This transfer may be bi-directional or omni-direction to or from the computer system 500. Computer code and user input transferred by the I/O interface 550 and the communications interface 560 and the UI 556 are typically in the form of signals, which may be electronic, electromagnetic, optical, or other signals capable of being sent and/or received by the interfaces. These signals may be transmitted via a variety of modes including wire or cable, fiber optics, a phone line, a cellular phone link, infrared ("IR"), and radio frequency ("RF") link, among others.

The I/O interface 550 may be any connection, wired or wireless, that allows the transfer of computer code. In one example, I/O interface 550 includes an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card, among others. In certain embodiments the I/O interface connects to an I/O unit 555 such as a user interface (UI) 556, monitor, speaker, printer, touch screen display, among others. Communications interface 560 may also be used to transfer computer code to computer system 500. Communication interfaces include a modem, network interface (such as an Ethernet card), wired or wireless systems (such as Wi-Fi, Bluetooth, and IR), local area networks, wide area networks, and intranets, among others.

The invention is also directed to computer products, otherwise referred to as computer program products, to provide software that includes computer code to the computer system 500. Processor 520 executes the computer code in order to implement the methods of the present invention. In one example, the methods according to the present invention may be implemented using software that includes the computer code that is loaded into the computer system 500 using a memory 530, 540 such as the mass storage drive 543, or through an I/O interface 550, communications interface 560, user interface UI 556 or any other interface with the computer system 500. The computer code in conjunction with the computer system 500 may perform any one of, or any combination of, the steps of any of the methods presented herein. The methods according to the present invention may be also performed automatically, or may be invoked by some form of manual intervention. The computer system 500, or network architecture, of FIG. 20 is provided only for purposes of illustration, such that the present invention is not limited to this specific embodiment.

Several embodiments of the present invention have been described. Nevertheless, it will be understood that various modifications may be made without departing from the spirit and scope of the invention. Accordingly, other embodiments are within the scope of the following claims.

What is claimed is:

1. A system for constructing an environmental, social and governance (ESG) investment portfolio comprising:

a computing system comprising at least a memory storing computer-executable instructions of an ESG application, and a processor coupled to the memory;

an ESG database comprising ESG data for one or more investment products used to construct an investment portfolio, wherein the ESG database is communicatively coupled to the computing system via a network;

an alpha database comprising alpha data for the one or more investment products used to construct the investment portfolio and wherein the alpha data comprise rate of return data for the one or more investment products, and wherein the alpha database is communicatively coupled to the computing system via the network;

a user interface for receiving a user's input for selecting an ESG selection factor at a time t;

wherein the ESG application comprises computer-executable instructions for extracting alpha data for the one or more investment products of the investment portfolio for a time period ending at time t from the alpha database, and upon receiving the user's ESG selection factor via the user interface, extracting ESG data for the user's selected ESG selection factor from the ESG database for the time period ending at time t, and then calculating a combined alpha-ESG rate of return for the investment portfolio, a combined alpha-ESG factor for the investment portfolio and a covariance between the combined alpha-ESG factor and the combined alpha-ESG rate of return for the investment portfolio; and wherein the processor executes the computer executable instructions of the ESG application that calculate the combined alpha-ESG rate of return for the investment portfolio via:

$$R_t^c = (1-\gamma)R_t + \gamma R_t^{ESG}$$

wherein $R_t$ comprises an alpha rate of return for the investment portfolio for the time period ending at time t, wherein $R_t^{ESG}$ comprises any third party, unbiased measure of the user's selected ESG selection factor at time t, wherein $\gamma$ is a tunable scalar and wherein product $\gamma R_t^{ESG}$ maps a measure of the selected ESG selection factor to a real number and adjusts it by the tunable scalar and wherein $R_t^c$ is the combined rate of return at the end of the time period ending at time t; and wherein the ESG data comprise an ESG dictionary that comprises words extracted from sustainability reports by:

reading all words from a plurality of sustainability reports;

ranking the words by frequency and constructing a word frequency list;

extracting a group of nouns from the word frequency list; and assigning polarity to each noun manually.

2. The system of claim 1, wherein the combined alpha-ESG factor for the investment portfolio is calculated via $$F_t^c = \sum_{i=1}^{M} v_i F_{i,t} + \sum_{j=M+1}^{N} v_j^{ESG} F_{j,t}^{ESG}.$$

wherein $F_{i,t}$ is an alpha factor, $F^{ESG}_{j,t}$ is an ESG selection factor, $v_i$, $v^{ESG}_j$ are weights, and $F^c_t$ is the combined alpha-ESG factor for the investment portfolio.

3. The system of claim 1, wherein the covariance between the combined alpha-ESG factor and the combined alpha- ESG rate of return for the investment portfolio is used to calculate an excess rate of return during the time period ending at time t via $$\alpha_t = \frac{(N-1)}{\lambda_t} \text{cov}(F_t^c, R_t^c)$$
$$= \frac{(N-1)}{\lambda_t} \rho(F_t^c, R_t^c)\sigma(F_t^c)\sigma(R_t^c)$$

wherein $\text{cov}(F_t^c, R_t^c)$ is the covariance between the combined alpha-ESG factor $F_t^c$ and combined alpha-ESG rate of return $R_t^c$, wherein $\rho(F_t^c, R_t^c)$ is a correlation of the combined alpha-ESG factor $F_t^c$ and the combined alpha-ESG rate of return $R_t^c$ and wherein $\sigma(F_t^c)$ is a standard deviation of the combined alpha-ESG factor $F_t^c$ and $\sigma(R_t^c)$ is the standard deviation of the alpha-ESG rate of return $R_t^c$.

4. The system of claim 1, wherein the ESG data comprise publicly available ESG vendor data and privately-generated ESG data.

5. The system of claim 4, wherein the privately-generated ESG data comprise one of employee sentiment, the ESG dictionary, management sentiment, number of women on board, ESG spin, ESG momentum, and ESG news.

6. The system of claim 4, wherein the privately-generated ESG data comprise employee sentiment data and the employee sentiment data are collected using web-scraping techniques.

7. The system of claim 4, wherein the privately-generated ESG data comprise management sentiment data that are extracted from company internal documents and communications using the ESG dictionary and calculating aggregate textual tone.

8. The system of claim 4, wherein the privately-generated ESG data comprise ESG spin data and the ESG spin data comprise a difference between publicly available ESG data and ESG management sentiment.

9. The system of claim 4, wherein the privately-generated ESG data comprise unusual ESG news collected using web-scraping techniques.

10. A system for constructing an environmental, social and governance (ESG) investment portfolio comprising:
a computing system comprising at least a memory storing computer-executable instructions of an ESG application, and a processor coupled to the memory;
an ESG database comprising ESG data for one or more investment products used to construct an investment portfolio, wherein the ESG database is communicatively coupled to the computing system via a network;
an alpha database comprising alpha data for the one or more investment products used to construct the investment portfolio and wherein the alpha data comprise rate of return data for the one or more investment products, and wherein the alpha database is communicatively coupled to the computing system via the network;
a user interface for receiving a user's input for selecting an ESG selection factor at a time t;
wherein the ESG application comprises computer-executable instructions for extracting alpha data for the one or more investment products of the investment portfolio for a time period ending at time t from the alpha database, and upon receiving the user's ESG selection factor via the user interface, extracting ESG data for the user's selected ESG selection factor from the ESG database for the time period ending at time t, and then calculating a combined alpha-ESG rate of return for the investment portfolio; and
wherein the ESG data comprise an ESG dictionary that comprises words extracted from sustainability reports by:
reading all words from a plurality of sustainability reports;
ranking the words by frequency and constructing a word frequency list;
extracting a group of nouns from the word frequency list; and
assigning polarity to each noun manually.

11. A method for constructing an environmental, social and governance (ESG) investment portfolio comprising:
providing a computing system comprising at least a memory storing computer-executable instructions of an ESG application, and a processor coupled to the memory;
providing an ESG database comprising ESG data for one or more investment products used to construct an investment portfolio, wherein the ESG database is communicatively coupled to the computing system via a network;
providing an alpha database comprising alpha data for the one or more investment products used to construct the investment portfolio and wherein the alpha data comprise rate of return data for the one or more investment products, wherein the alpha database is communicatively coupled to the computing system via the network;
receiving a user's input for selecting an ESG selection factor via a user interface at a time t;
extracting alpha data for the one or more investment products of the investment portfolio for a time period ending at time t from the alpha database using the ESG application, and upon receiving the user's ESG selection factor via the user interface, extracting ESG data for the user's selected ESG selection factor for the time period ending at time t from the ESG database, and then calculating a combined alpha-ESG rate of return for the investment portfolio, a combined alpha-ESG factor for the investment portfolio and a covariance between the combined alpha-ESG factor and the combined alpha-ESG rate of return for the investment portfolio; and
wherein the processor executes the computer-implemented instructions of the ESG application that calculate the combined alpha-ESG rate of return for the investment portfolio is calculated via $$R_t^c = (1-\gamma)R_t + \gamma R_t^{ESG}$$

wherein $R_t$ comprises an alpha rate of return for the investment portfolio for the time period ending at time t, wherein $R_t^{ESG}$ comprises any third party, unbiased measure of the user's selected ESG selection factor at time t, wherein $\gamma$ is a tunable scalar and wherein product $\gamma R_t^{ESG}$ maps a measure of the selected ESG selection factor to a real number and adjusts it by the tunable scalar and wherein $R_t^c$ is the combined rate of return at the end of the time period ending at time t; and
wherein the ESG data comprise an ESG disctionary that comprises words extracted from sustainability reports by:
reading all words from a plurality of sustainability reports;
ranking the words by frequency and constructing a word frequency list;

extracting a group of nouns from the word frequency list; and assigning polarity to each noun manually.

12. The method of claim 11, wherein the combined alpha-ESG factor for the investment portfolio is calculated via $$F_t^c = \sum_{i=1}^{M} v_i F_{i,t} + \sum_{j=M+1}^{N} v_j^{ESG} F_{j,t}^{ESG}.$$

wherein $F_{i,t}$ is an alpha factor, $F^{ESG}_{j,t}$ is an ESG selection factor, $v_i$, $v^{ESG}_j$ are weights, and $F^c_t$ is the combined alpha-ESG factor for the investment portfolio.

13. The method of claim 11, wherein the covariance between the combined alpha-ESG factor and the combined alpha-ESG rate of return for the investment portfolio is used to calculate an excess rate of return during the time period ending at time t via $$\alpha_t = \frac{(N-1)}{\lambda_t} \text{cov}(F_t^c, R_t^c)$$
$$= \frac{(N-1)}{\lambda_t} \rho(F_t^c, R_t^c) \sigma(F_t^c) \sigma(R_t^c)$$

wherein $\text{cov}(F^c_t, R_t^c)$ is the covariance between the combined alpha-ESG factor $F^c_t$ and combined alpha-ESG rate of return $R_t^c$, wherein $\rho(F^c_t, R_t^c)$ is a correlation of the combined alpha-ESG factor $F^c_t$ and the combined alpha-ESG rate of return $R_t^c$ and wherein $\sigma(F^c_t)$ is a standard deviation of the combined alpha-ESG factor $F^c_t$ and $\sigma(R_t^c)$ is the standard deviation of the alpha-ESG rate of return $R_t^c$.

14. The method of claim 11, wherein the ESG data comprise publicly available ESG vendor data and privately-generated ESG data and wherein the privately-generated ESG data comprise one of employee sentiment, the ESG dictionary, management sentiment, number of women on board, ESG spin, ESG momentum, and unusual ESG news.

* * * * *